(12) United States Patent
Klippert et al.

(10) Patent No.: US 9,249,892 B2
(45) Date of Patent: Feb. 2, 2016

(54) ACTUATING DRIVE OF AN AIR PASSAGE DEVICE

(75) Inventors: Uwe Klippert, Oberaula (DE); Gerald Terraz, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 97 days.

(21) Appl. No.: 14/111,849

(22) PCT Filed: Apr. 16, 2012

(86) PCT No.: PCT/EP2012/056926
§ 371 (c)(1),
(2), (4) Date: Dec. 18, 2013

(87) PCT Pub. No.: WO2012/140263
PCT Pub. Date: Oct. 18, 2012

(65) Prior Publication Data
US 2014/0097366 A1    Apr. 10, 2014

(30) Foreign Application Priority Data
Apr. 15, 2011   (DE) .................. 10 2011 007 523

(51) Int. Cl.
*F16K 31/02* (2006.01)
*F16K 31/44* (2006.01)
(Continued)

(52) U.S. Cl.
CPC ............... *F16K 31/02* (2013.01); *B60K 11/085* (2013.01); *F01P 7/12* (2013.01); *F01P 11/14* (2013.01); *H02K 7/10* (2013.01); *H02K 7/1166* (2013.01);
(Continued)

(58) Field of Classification Search
CPC ........ F16K 31/02; F16K 31/04; F16K 31/041; F16K 31/042
USPC ........... 251/68, 69, 74, 129.11, 231, 232, 238
See application file for complete search history.

(56) References Cited

U.S. PATENT DOCUMENTS 1,640,233 A   8/1927   Collins
1,858,622 A   5/1932   Gysin
(Continued)

FOREIGN PATENT DOCUMENTS

CN   1481480 A   3/2004
CN   1641193 A   7/2005
(Continued)

OTHER PUBLICATIONS

English translation of Korean Office action for Application No. 10-2013-7029698, dated Nov. 28, 2014, 4 pages.
(Continued)

*Primary Examiner* — John K Fristoe, Jr.
*Assistant Examiner* — Kelsey Rohman
(74) *Attorney, Agent, or Firm* — Chrisite, Parker & Hale, LLP

(57) ABSTRACT

An actuating drive of an air passage device for an engine cooling system of a vehicle, the actuating drive including a drive gear to be driven by an electric motor, which is rotatable about an axis of rotation, and an output element which is operatively connected with the drive gear and is movable with the drive gear along an adjustment path, in order to shift the air passage device between an open position, in which the air passage device is opened in order to allow an air stream to pass through, and a closed position in which the air passage device is closed in order to minimize an air stream.

13 Claims, 26 Drawing Sheets

(51) Int. Cl.
- *H02K 7/10* (2006.01)
- *H02K 7/116* (2006.01)
- *B60K 11/08* (2006.01)
- *F01P 7/12* (2006.01)
- *F01P 11/14* (2006.01)
- *F16K 31/04* (2006.01)

(52) U.S. Cl.
CPC ............. *F16K 31/04* (2013.01); *F16K 31/041* (2013.01); *F16K 31/042* (2013.01); *H02K 2213/06* (2013.01)

(56) References Cited

U.S. PATENT DOCUMENTS

| | | | |
|---|---|---|---|
| 3,226,025 A | | 12/1965 | Ferris |
| 5,950,765 A | * | 9/1999 | Pearson et al. ............... 185/40 R |
| 6,953,185 B2 | * | 10/2005 | Steinborn ................ 251/129.11 |
| 6,955,335 B2 | * | 10/2005 | Kawai et al. ............. 251/129.11 |
| 7,028,979 B2 | | 4/2006 | Fauni |
| 2004/0076509 A1 | | 4/2004 | Steinborn |
| 2004/0103736 A1 | | 6/2004 | Kawai et al. |
| 2005/0263731 A1 | * | 12/2005 | Fauni ....................... 251/129.11 |

FOREIGN PATENT DOCUMENTS

| | | |
|---|---|---|
| DE | 39 05 717 A1 | 8/1990 |
| DE | 10 2009 035 362 A1 | 2/2001 |
| DE | 100 47 952 B4 | 4/2002 |
| DE | 10 2005 040 290 A1 | 2/2007 |
| DE | 10 2008 013 422 A1 | 9/2009 |
| EP | 1 356 850 A1 | 10/2003 |
| JP | 64-18744 | 1/1989 |

OTHER PUBLICATIONS

English translation of the International Preliminary Report on Patentability for International Application No. PCT/EP2012/056926, date of mailing Oct. 24, 2013, 7 pages.

Chinese Office action for Application No. 201280018670.5, dated Jul. 10, 2015, 8 pp. and English translation, 3 pages.

Chinese Search Report for Application No. 2012800186705, dated Jun. 12, 2015, 2 pages.

* cited by examiner

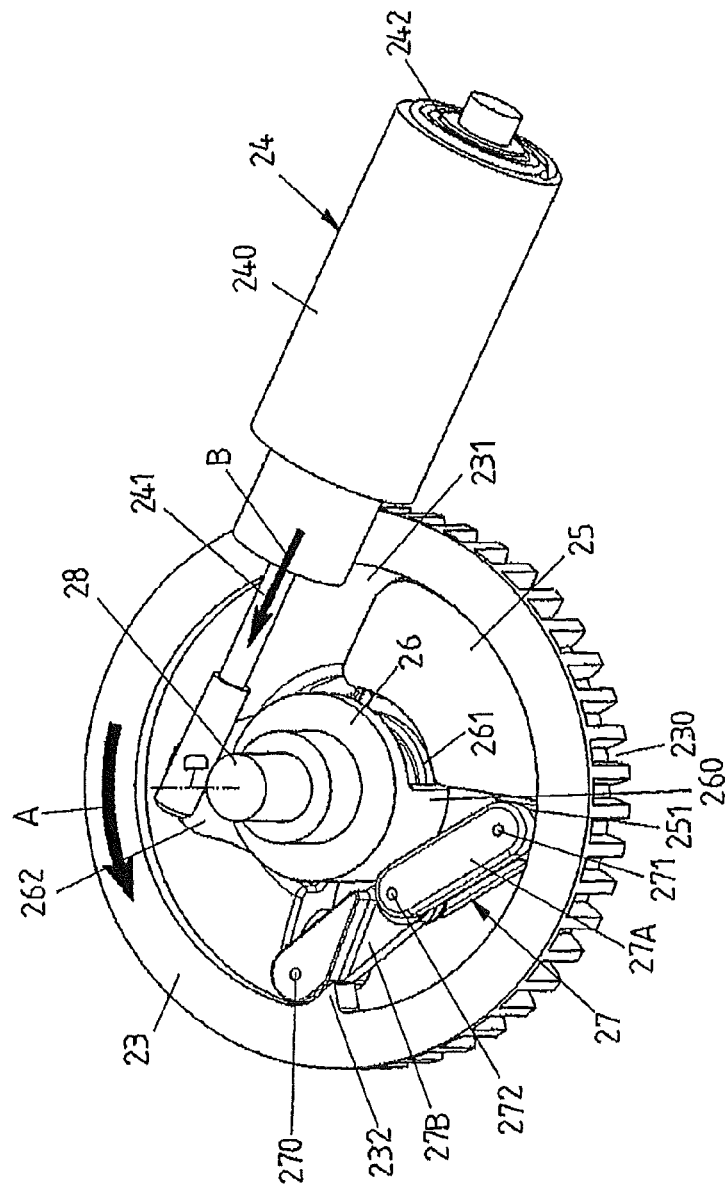

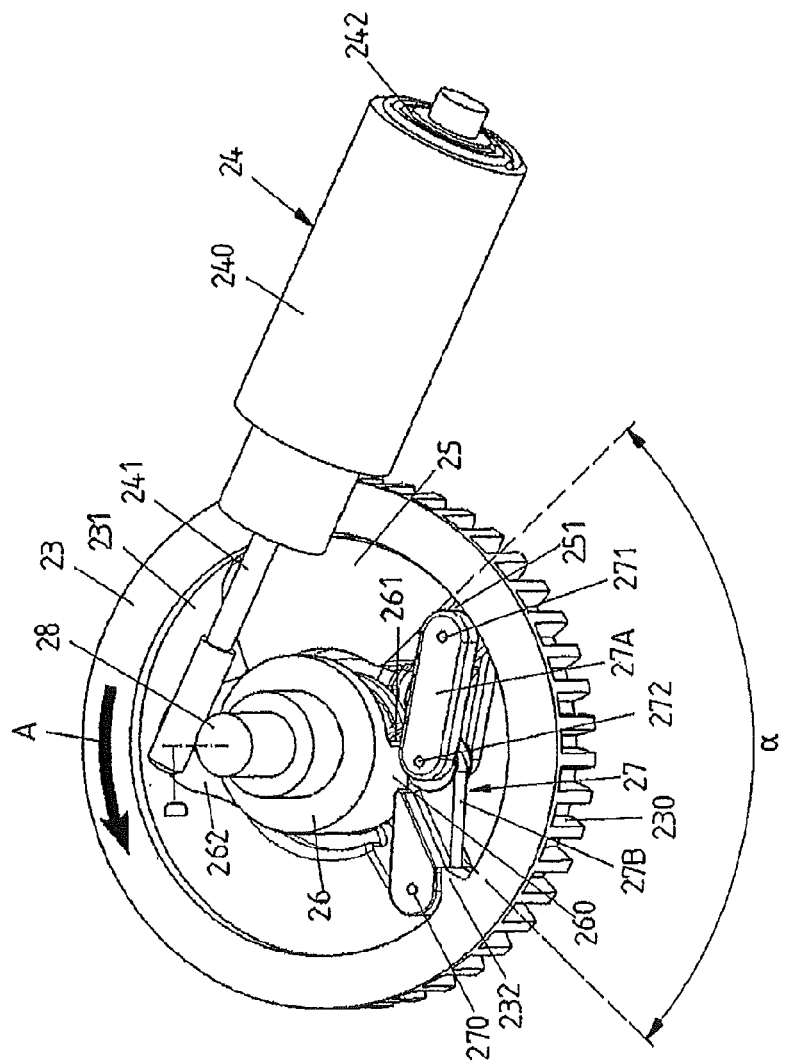

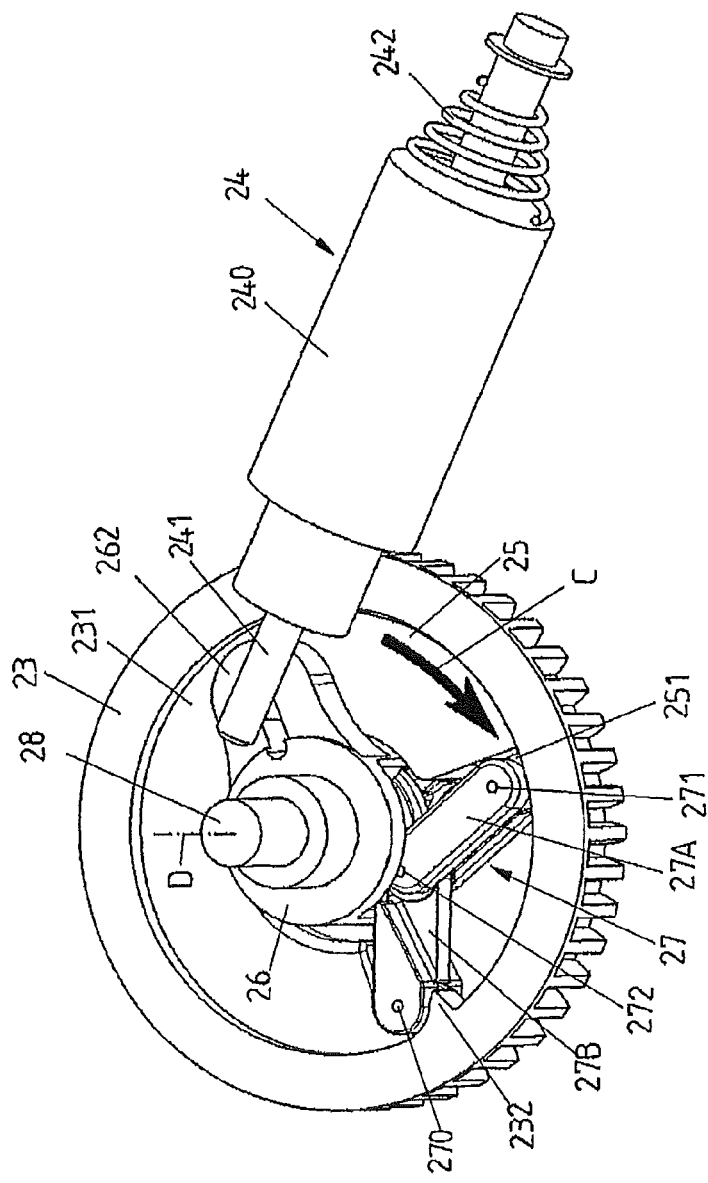

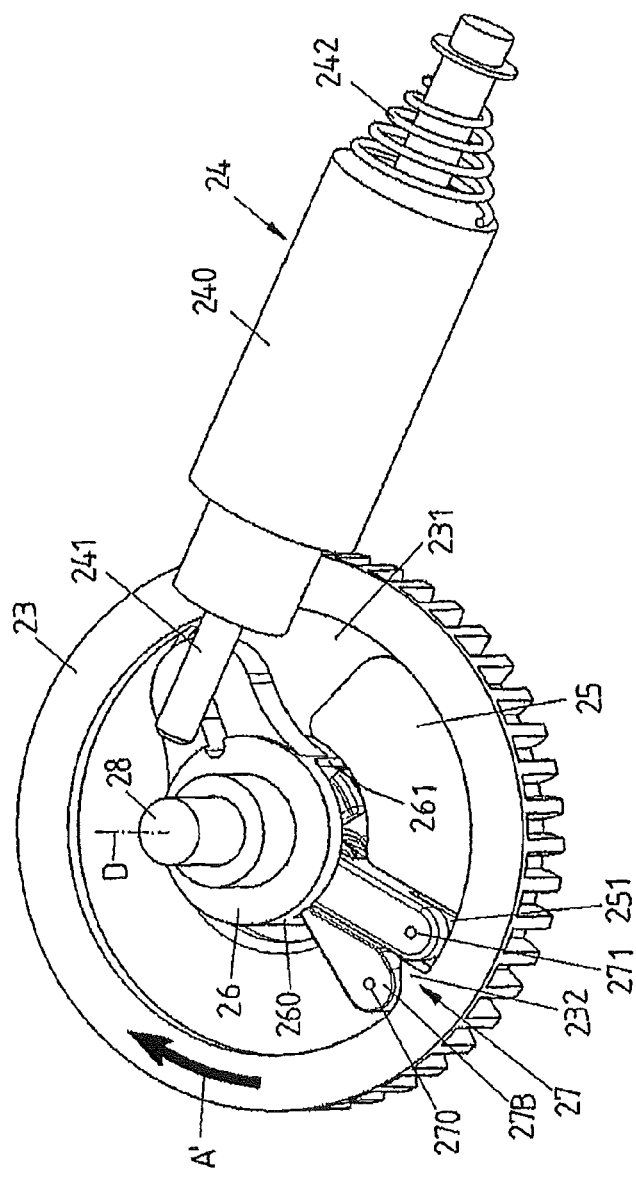

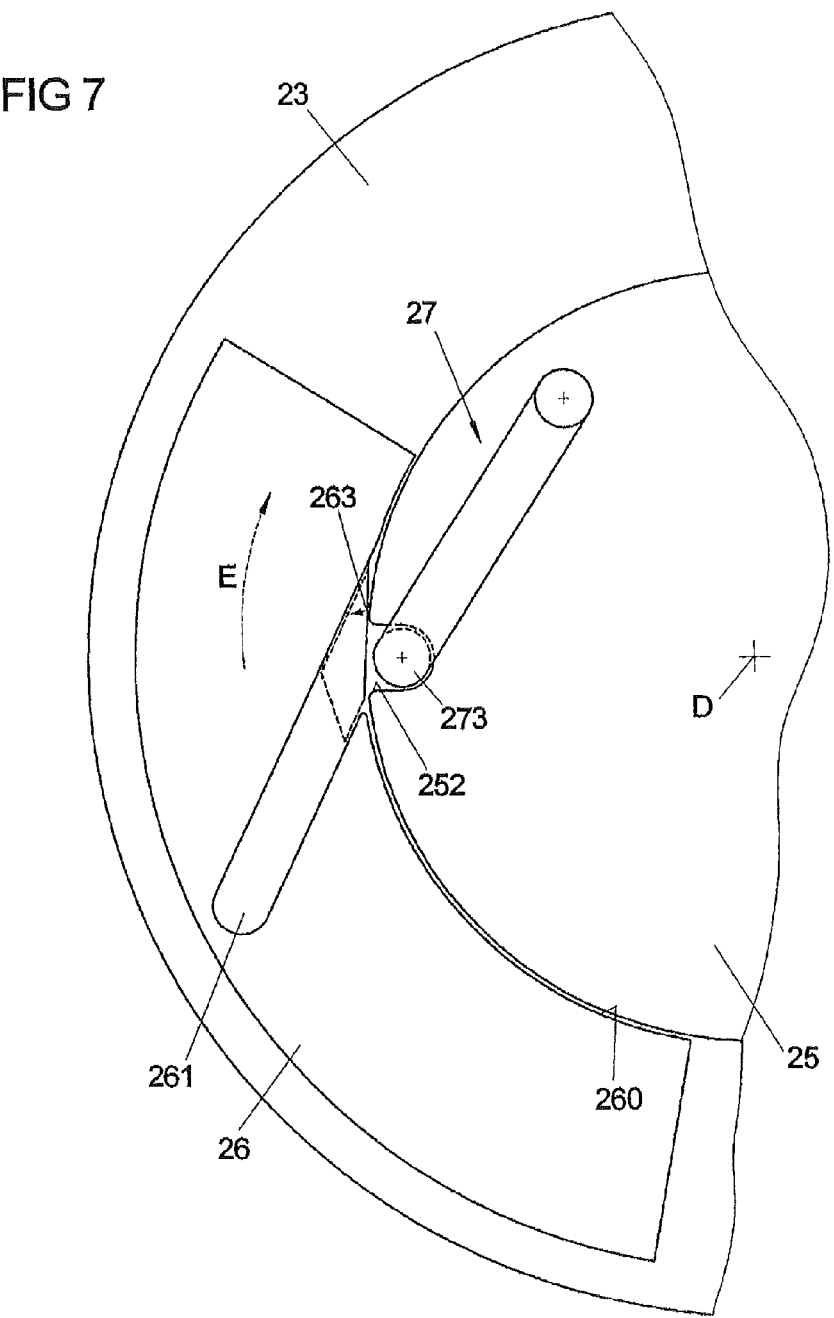

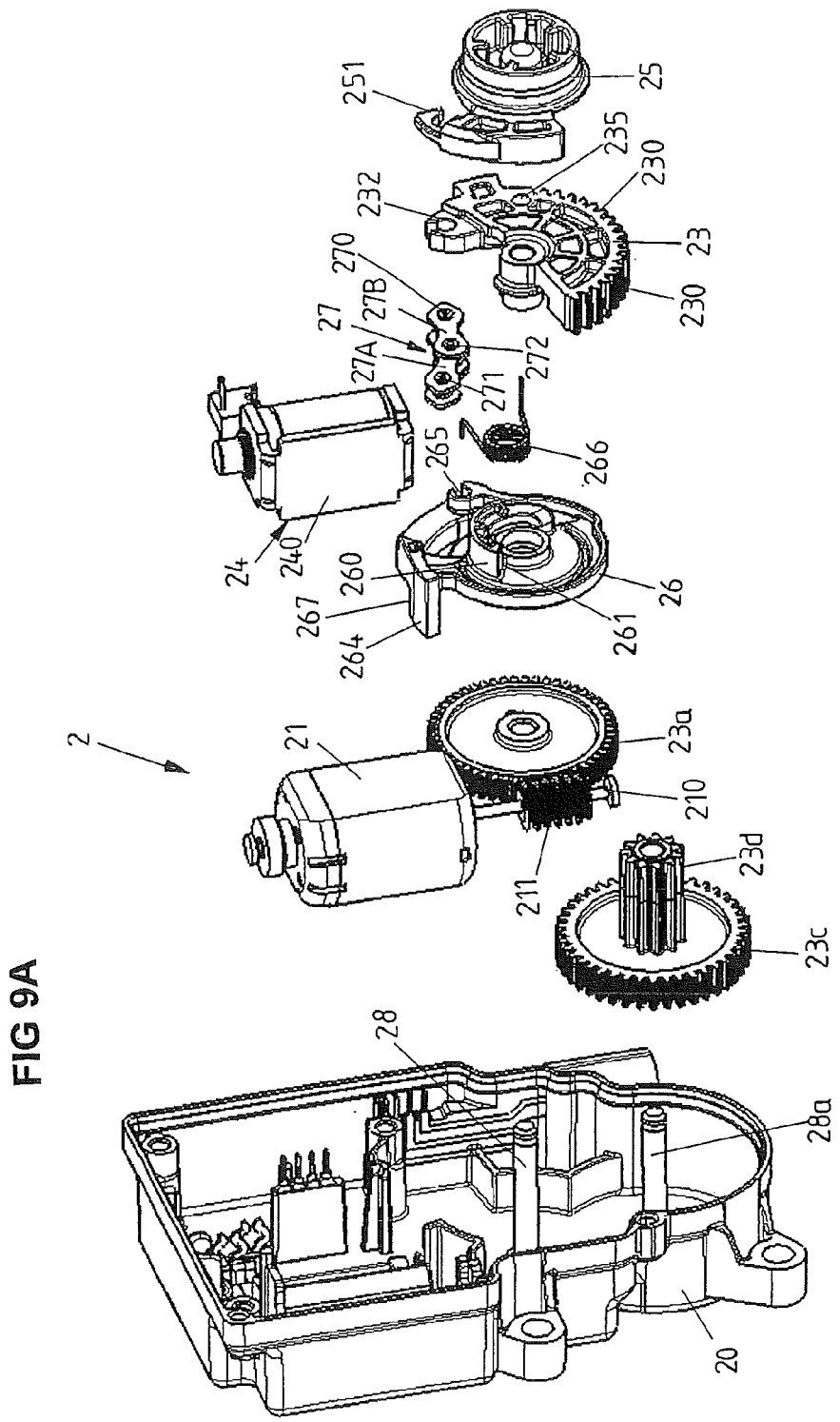

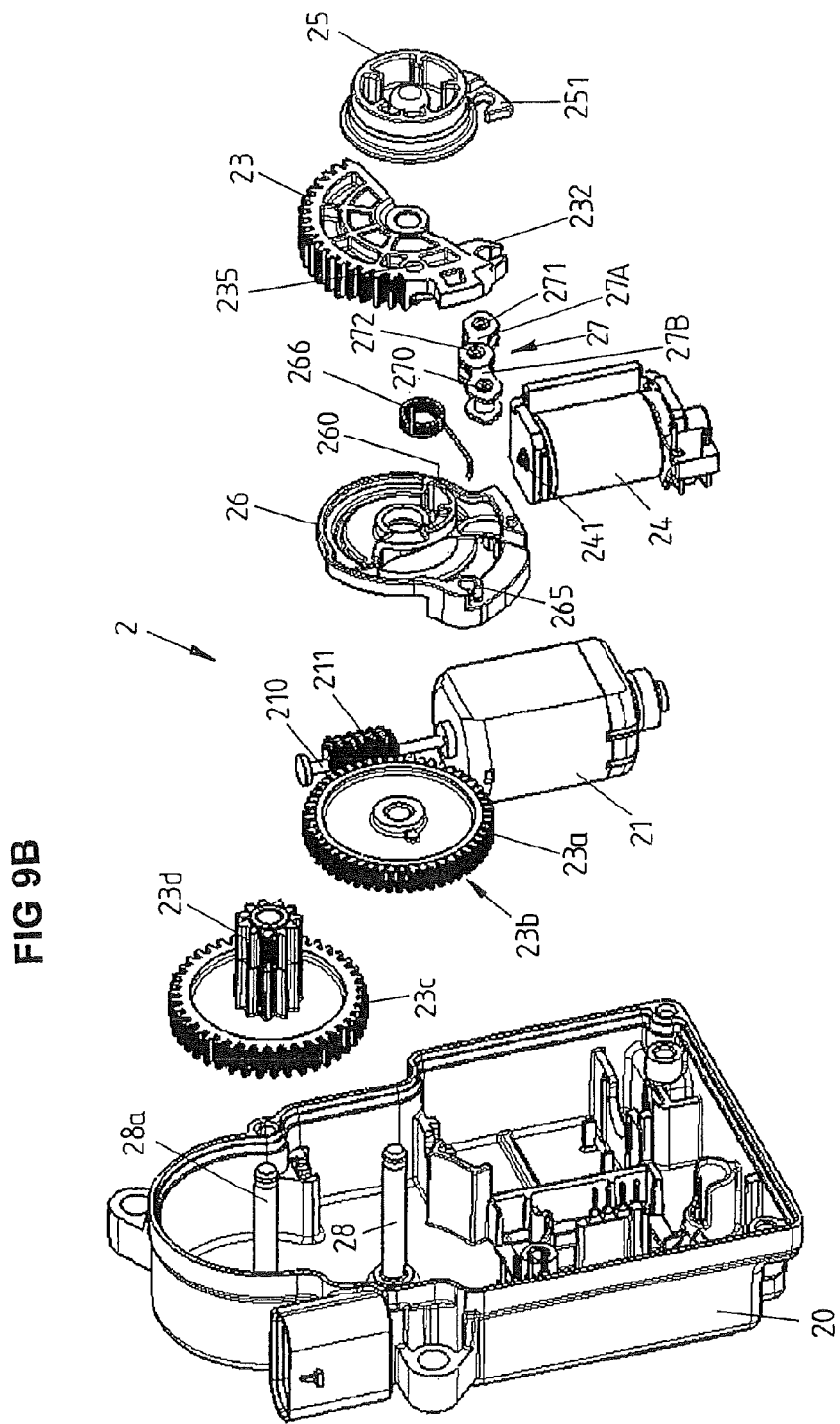

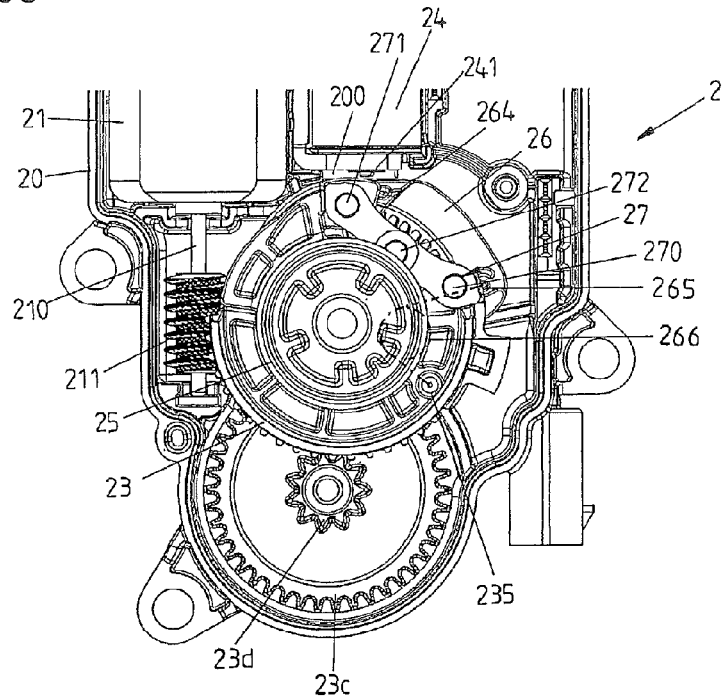
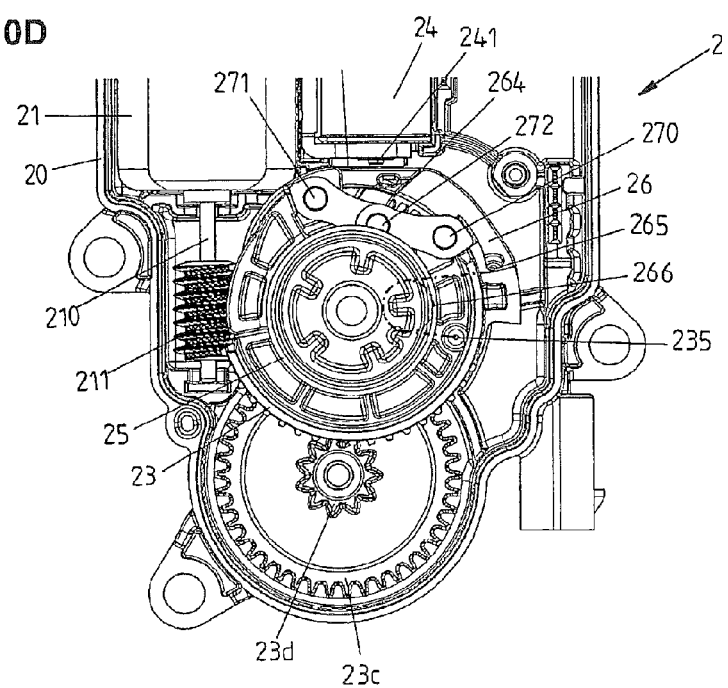

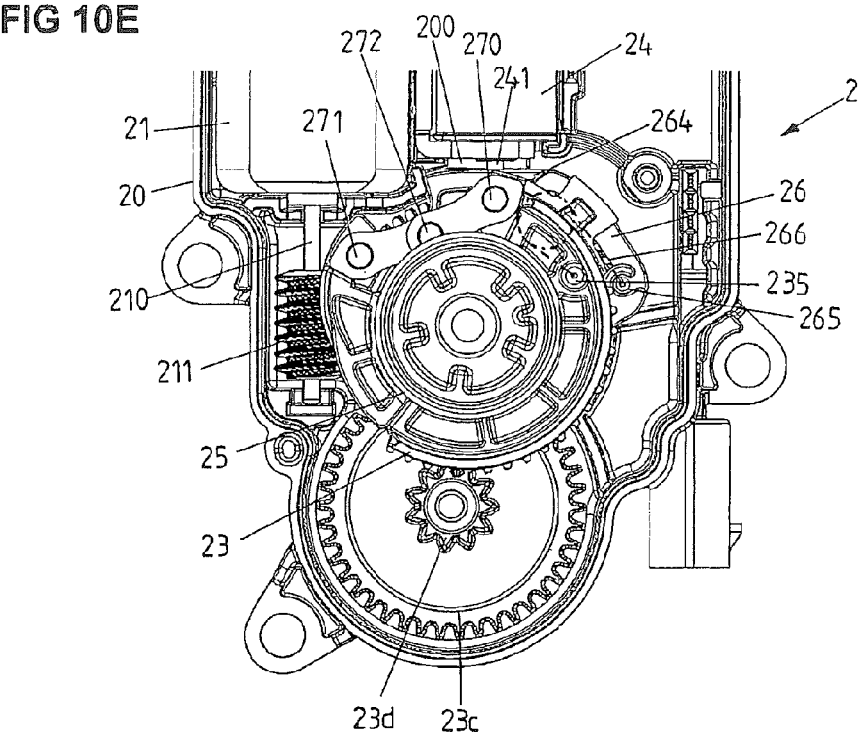
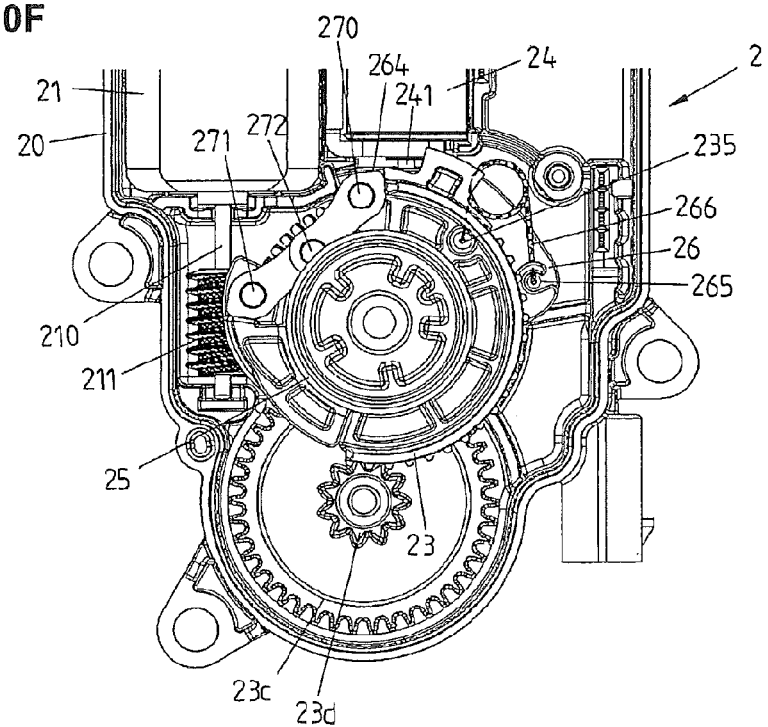

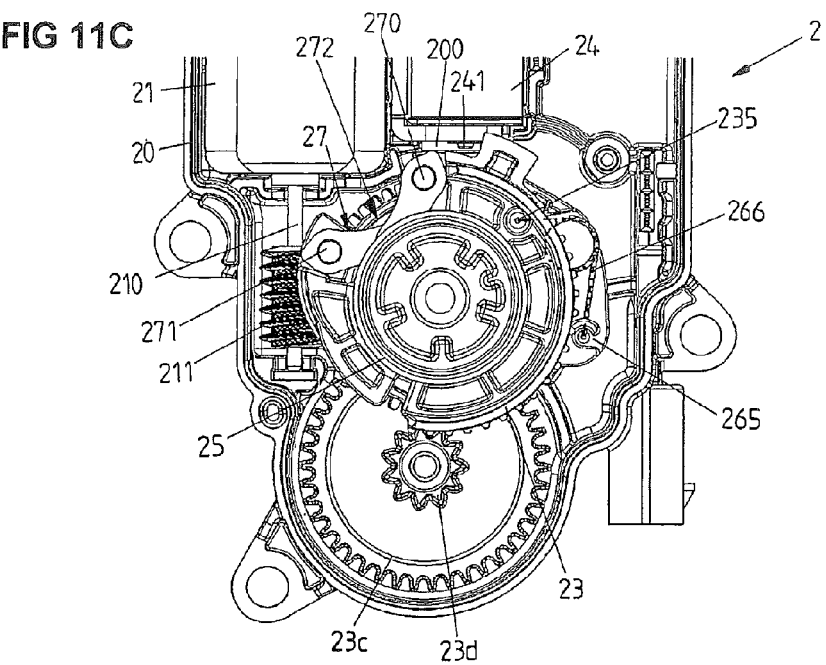
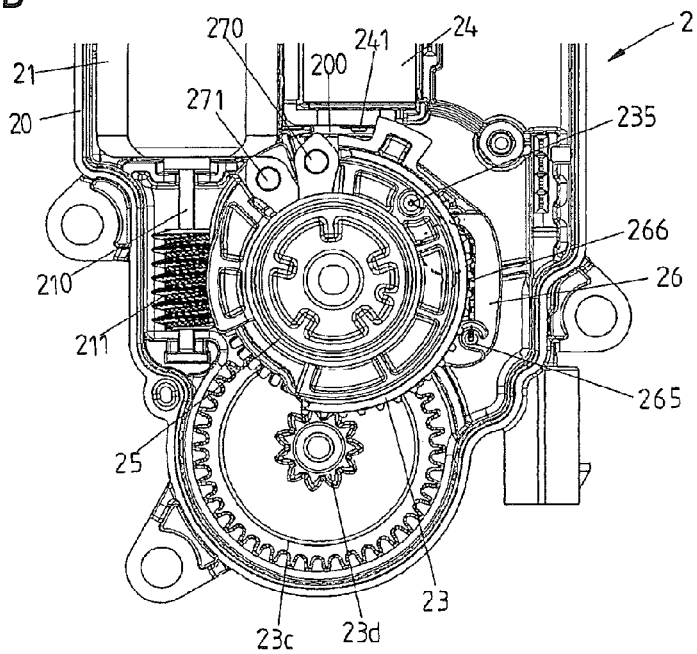

ACTUATING DRIVE OF AN AIR PASSAGE DEVICE

CROSS-REFERENCE TO A RELATED APPLICATION

This application is a National Phase Patent Application of International Patent Application Number PCT/EP2012/056926, filed on Apr. 16, 2012, which claims priority of German Patent Application Number 10 2011 007 523.2, filed on Apr. 15, 2011.

BACKGROUND

This invention relates to an actuating drive of an air passage device for an engine cooling system of a vehicle.

Such actuating drive comprises a drive gear to be driven by an electric motor, which is rotatable about an axis of rotation, and an output element which is operatively connected with the drive gear and is movable with the drive gear along an adjustment path, in order to shift the air passage device between an open position, in which the air passage device is opened in order to allow an air stream to pass through, and a closed position in which the air passage device is closed in order to minimize the air stream.

Such air passage device can be arranged for example at the front of the vehicle and control an air stream into an engine compartment of the vehicle. For this purpose, the air passage device for example can include closing elements in the manner of slats, which can be shifted in order to vary the flow cross-section for the air stream and in this way adjust an air stream for cooling an engine in the engine compartment.

Such air passage devices are well-known in different designs. By way of example, reference is made to DE 10 2008 013 422 A1 and DE 100 47 952 B4.

Conventional actuating drives of passage devices often use a so-called vacuum cell with a spring-biased membrane. With such a vacuum cell, a membrane is moved by a solenoid valve against a biasing spring and a vacuum is passed on, which effects an adjustment force for shifting the air passage device in direction of its closed position.

Such vacuum cells have the advantage that they have a simple construction and are available at low cost. In addition, they have an inherent safety function in that in the case of a failure of the energy supply system of the vehicle an opening of the air passage device is effected automatically, because the electromagnetic force on the membrane decreases and due to the spring action the membrane moves the air passage device back into its open position (so-called "fail-safe" logic). In the case of a failure of the electrical supply of the actuating drive, and in case a further electromotive control of the air passage device is not possible, the air passage device thus is automatically moved into its open position, so that an air cooling of an engine to be cooled still is ensured.

It is desirable, however, to use an electromotive driving device, for example an electric step motor, for an actuating drive instead of such vacuum cell. A disadvantage when using a vacuum cell consists in that it must be formed comparatively large, in order to be able to apply a sufficient adjustment force for closing an air passage device. This is due to the fact that in an air passage device slats possibly must be moved against a pressing wind force at a great driving speed of a vehicle, so that large adjustment forces are required for moving the slats. The use of an electromotive driving device on the other hand has the advantage that the same can be dimensioned comparatively small. The required adjustment force then is achieved in that the electromotive driving device is coupled with an output element via a reduction gear for shifting the air passage device, so as to transmit a drive movement of the driving device in a stepped-down manner into an output movement of the output element.

When a reduction gear is used, the same can effect self-locking or a high reaction torque in the drive train of the actuating drive. This is not disadvantageous as such, but leads to the fact that in the case of a failure of the energy supply system resetting of the air passage device into its open position for increasing the flow cross-section is not easily possible, because the self-locking actuating drive blocks adjustment forces acting on the output side, and shifting of the air passage device thus only is possible via the actuating drive.

From DE 10 2009 035 362 A1 an actuating drive for an air passage device is known, which provides two separate actuating devices, namely on the one hand a normal-operation actuating device and on the other hand an emergency-operation actuating device. The operation of the actuating devices is controlled thermally: when a temperature of a predetermined region of the vehicle is below a threshold temperature, only the normal-operation actuating device is active and coupled with an output element; when the temperature however is above the threshold temperature, the normal-operation actuating device is decoupled from the output element, and the emergency-operation actuating device moves the output element in direction of an opening of the air passage device.

SUMMARY

It is an object of the present invention to provide an actuating drive of an air passage device to be driven by an electric motor, which in the case of a failure of an energy supply system of a vehicle provides for resetting the air passage device from a closed position into an open position, in which the air passage device is opened for allowing an air stream to pass through.

According to an exemplary embodiment of the invention, in an actuating drive
  a transmission element arranged between the drive gear and the output element for establishing the operative connection between the drive gear and the output element, and
  an actuator which cooperates with the transmission element such that in a first position of the actuator the output element is directly coupled with the drive gear for movement along the adjustment path and in a second position of the actuator, at least when the output element is located in a predetermined portion of the adjustment path, is movable relative to the drive gear,
is provided.

In an actuating drive according to the invention, the coupling between the drive gear and the output element is accomplished via a transmission element which in dependence on the position of an actuator effects a direct coupling between the drive gear and the output element or permits a relative movement between the drive gear and the output element. By the fact that the transmission element establishes a rigid coupling between the drive gear and the output element it is to be understood here that in the case of a drive movement of the drive gear the output element is moved together with the drive gear. Such direct coupling is provided along the entire adjustment path of the output element, when the actuator is in the first position. When the actuator, however, is in the second position, the output element can be moved relative to the drive gear—under the additional marginal condition that a relative movement only is possible when the output element is located in a predetermined portion of the adjustment path, wherein the predetermined portion can comprise the entire adjustment path or a part of the adjustment path.

By providing the transmission element a safety function ("fail-safe" function) thus is provided, which under certain conditions provides for a movement of the output element independent of the drive gear.

The actuator for example can be shiftable between the first position and the second position in dependence on a voltage condition of a voltage applied at the actuating drive, via which a driving device driving the drive gear is actuated. In particular the actuator can be in the first position, when a sufficient voltage is provided via an energy supply system. When this voltage drops, however, and a sufficient voltage no longer is applied at the actuating drive, the actuator is shifted into the second position, so that possibly a relative movement is possible between the output element and the drive gear. In the case of a failure of the energy supply, the output element and together with the output element slats of the air passage device thus can be shifted in direction of their open position, in order to ensure that even without an electrical supply of the actuating drive a sufficient cooling is ensured by means of an air stream flowing through the air passage device.

Depending on the position of the actuator and depending on where on the adjustment path the output element is located, a decoupling of the output element from the drive gear thus can be effected. That such decoupling not exclusively is made dependent on the position of the actuator, but in addition the position of the output element on its adjustment path also is considered, is due to the fact that decoupling and resetting of the air passage device into its open position is not required when the air passage device anyway is in the open position. When the output element thus is located in a portion of the adjustment path, which corresponds to an open or at least partly open position of the air passage device, the drive gear is not decoupled from the output element and the output element is not shiftable relative to the drive gear. Only when the output element is in a position on its adjustment path which corresponds to a closed or at least largely closed position of the air passage device, and the actuator in addition is in its second position (and thereby indicates a failure of a sufficient electrical supply), the output element is decoupled from the drive gear via the transmission element and thus a relative movement between the output element and the drive gear becomes possible.

The output element preferably is shiftably mounted on the drive gear along a circumferential direction about the axis of rotation. The transmission element advantageously is arranged in a non-positive connection between the drive gear and the output element and can be formed for example by two levers pivotally connected with each other via a joint. The one of these levers is pivotally connected with the drive gear via a first articulation point and the other one of the levers is pivotally connected with the output element via a second articulation point. The transmission element thus forms a hinged lever which in dependence on the position of the actuator provides a direct coupling of the drive gear with the output element mounted thereon or provides for a relative movement between the output element and the drive gear due to the fact that the output element can be shifted to the drive gear.

The actuator for example can cooperate with an adjusting element rotatably mounted about the axis of rotation of the drive gear, which includes a circumferential cylindrical shell surface and a cutout arranged at the shell surface, which interrupts the shell surface. The transmission element is supported on the shell surface, in order to provide the direct connection between the drive gear and the output element, when the actuator is in the first position. In this way, the output element and the drive gear are not directly coupled with each other, so that the output element cannot be moved relative to the drive gear and during a movement of the drive gear is rigidly moved together with the drive gear. When the actuator, however, is in the second position and the output element is located in a predetermined portion of the adjustment path (which in particular can correspond to a closed or at least almost closed position of the air passage device), the transmission element can immerse into the cutout, so that the output element can be moved relative to the drive gear.

Depending on two logical conditions, namely the position of the actuator on the one hand and the position of the output element on its adjustment path on the other hand, a relative movement of the output element relative to the drive gear thus becomes possible, so as to decouple the output element from the drive gear, when the logical conditions are fulfilled, and provide for resetting of the air passage device in direction of its open position.

When it is in its first position, the actuator holds the adjusting element in a support position in which the transmission element is supported on the shell surface. In the support position, the output element thus is forcedly coupled with the drive element along the entire adjustment path, so that the output element is moved together with the drive element, when the drive element is driven.

For this purpose, the actuator can directly act on the adjusting element, in that it is directly coupled with the adjusting element and moves the adjusting element into the support position or out of the support position. A movement of the actuator thus is transmitted to the adjusting element, and depending on the movement of the actuator, i.e. for example during retraction or extension of a shank of the actuator for example formed as lifting magnet, the adjusting element is shifted.

It is, however, also conceivable and possible that the actuator is not coupled with the adjusting element for moving the same, but merely acts on the adjusting element in the support position for holding the adjusting element in the support position. In its first position, the actuator thus locks the adjusting element in the support position, and when the actuator is transferred into its second position, it releases the adjusting element, so that the adjusting element can get out of the support position. In the support position, the adjusting element therefore can rest for example against a stop of a housing of the actuating drive and in the first position of the actuator be lockingly held in contact with the stop.

In this case, a movement of the adjusting element is not effected directly by the actuator, which in the support position merely lockingly acts on the adjusting element. To move the adjusting element into the support position and out of the support position, a mechanical spring for example can be provided, which couples the adjusting element with the drive element and is formed to move the adjusting element from the support position into a release position, in which the transmission element can immerse into the cutout, when the actuator is transferred from its first position into the second position and the output element is located in the predetermined portion of the adjustment path.

In other words, a mechanical spring is provided between the adjusting element and the drive element, which mechanically biases the adjusting element with respect to the drive element. When the output element is located in the predetermined portion of the adjustment path, in which decoupling of the output element from the drive element should be possible, the bias of the mechanical spring effects that the adjusting element is moved relative to the drive element from its support position into the release position, when the actuator releases the adjusting element. The adjusting element then is moved and gets into the release position in which the transmission element can immerse into the cutout at the adjusting element, so that the output element can be moved relative to the drive element and thus decoupling of the output element from the drive element is effected.

The mechanical spring can fulfill a dual function. On the one hand it serves to move the adjusting element out of the support position, when the output element is located in the predetermined portion of the adjustment path and the actuator unlockingly releases the adjusting element. On the other hand, however, the mechanical spring also can serve to move the adjusting element from the release position back into the support position, when the output element is moved from a starting position outside the predetermined portion of the adjustment path, driven by the drive element, in direction of the predetermined portion of the adjustment path. The mechanical spring thus also can serve for resetting the adjusting element into the support position, when the output element, driven by the drive element, is moved from its starting position outside the predetermined portion of the adjustment path—i.e. outside a range of the adjustment path in which decoupling of the output element from the drive element should be effected—in direction of the predetermined portion. For this purpose, in dependence on the position of the drive element relative to the adjusting element a reversal of direction of the force acting between the drive element and the adjusting element can be effected, so that a force acts on the adjusting element out of the support position, when the output element is located in the predetermined portion of the adjustment path, whereas a force in direction of the support position is effected when the output element is moved from a starting position outside the predetermined portion in direction of the adjustment path.

The actuator for example can be formed to take the first position when an electric voltage provided by an energy supply system of the vehicle lies above a predetermined limit value, or to take the second position when the electric voltage of the energy supply system lies below the predetermined limit value. Depending on the condition of the energy supply system of the vehicle supplying the actuating drive, the actuator thus is shifted and acts on the transmission element, in order to possibly provide a decoupling of the output element and the drive gear.

The actuator for example can comprise an electric or electromagnetic actuating element. It is, however, also conceivable to pneumatically form the actuator or by using an adjusting element made of a so-called shape-memory alloy. Shape-memory alloy is understood to be a material which can assume different shapes depending on the temperature. An adjusting element made of such shape-memory alloy can be used to vary an actuator position depending on the temperature, so as to bring the actuator into the first position or into the second position.

Preferably, the actuator includes an electric lifting magnet as actuating element. Such electric lifting magnet is energized depending on the applied voltage and transfers the actuator, in the energized condition, into the first position. When the voltage provided by the energy supply system of the vehicle drops, so that the voltage is too low or no more voltage is applied at all, the energization of the electric lifting magnet is interrupted and the actuator is transferred into its second position, so that possibly a relative movement—depending on the position of the output element on its adjustment path—becomes possible.

BRIEF DESCRIPTION OF THE DRAWINGS

The idea underlying the invention will be explained in detail below with reference to the exemplary embodiments illustrated in the Figures.

FIGS. 2A-2D show views of an actuating drive of an air passage device in a normal operation.

FIGS. 3A-3D show views of the actuating drive with the actuator in the non-energized condition and the output element in a portion of its adjustment path which corresponds to a closed or almost closed air passage device.

FIGS. 4A-4C show views of the actuating drive, representing the return of the actuating drive into a proper operational condition after a relative movement of the output element relative to a drive gear of the actuating drive.

FIG. 7 shows a further exemplary embodiment of an actuating drive with a drive gear and an output element, in turn coupled via a push rod.

FIGS. 9A, 9B show exploded views of a further exemplary embodiment of an actuating drive of an air passage device.

FIGS. 10A-10F show views of the actuating drive in a normal operation.

FIGS. 11A-11D show views of the actuating drive with an actuator in the non-energized condition and an output element in a portion of an adjustment path which corresponds to a closed or almost closed air passage device.

DETAILED DESCRIPTION

Figure 1:
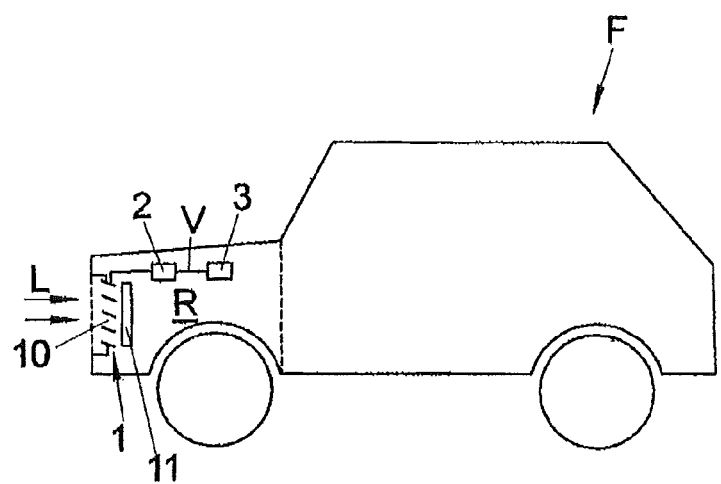
FIG. 1 shows a schematic view of a vehicle with an air passage device arranged at the front of the vehicle.

FIG. 1 shows a schematic view of a vehicle F which includes an air passage device 1 arranged in an engine compartment R in a front region of the vehicle F.

The air passage device 1, which is arranged at the front end face of the vehicle F in the region of a radiator grille, serves for controlling an air stream L into the engine compartment R for cooling an engine arranged in the engine compartment R. The air passage device 1 for this purpose includes a number of adjustable slats 10, which in an open position of the air passage device 1 provide a large flow cross-section for the air stream L into the engine compartment R of the vehicle F and can be adjusted for reducing the flow cross-section.

In flow direction behind the slats 10 a fan 11 is arranged for sucking in the air stream L.

An actuating drive 2 acts on the slats 10, which is connected with an electric energy supply system 3 of the vehicle F. The electromotive actuating drive 2 serves for adjusting the slats 10 for varying the flow cross-section of the air passage device 1 and is supplied with electricity via the energy supply system of the vehicle, which for this purpose provides a voltage V via which an electromotive driving device of the actuating drive 2 can be operated.

An exemplary embodiment of such actuating drive 2 is shown in FIGS. 2A-D, 3A-D and 4A-C in different views and operating conditions. First of all, reference will be made to FIG. 2A for the basic construction of the actuating drive 2, before the mode of operation and the sequence of movements of the actuating drive 2 will be explained in detail with reference to the remaining views.

Figure 2A:
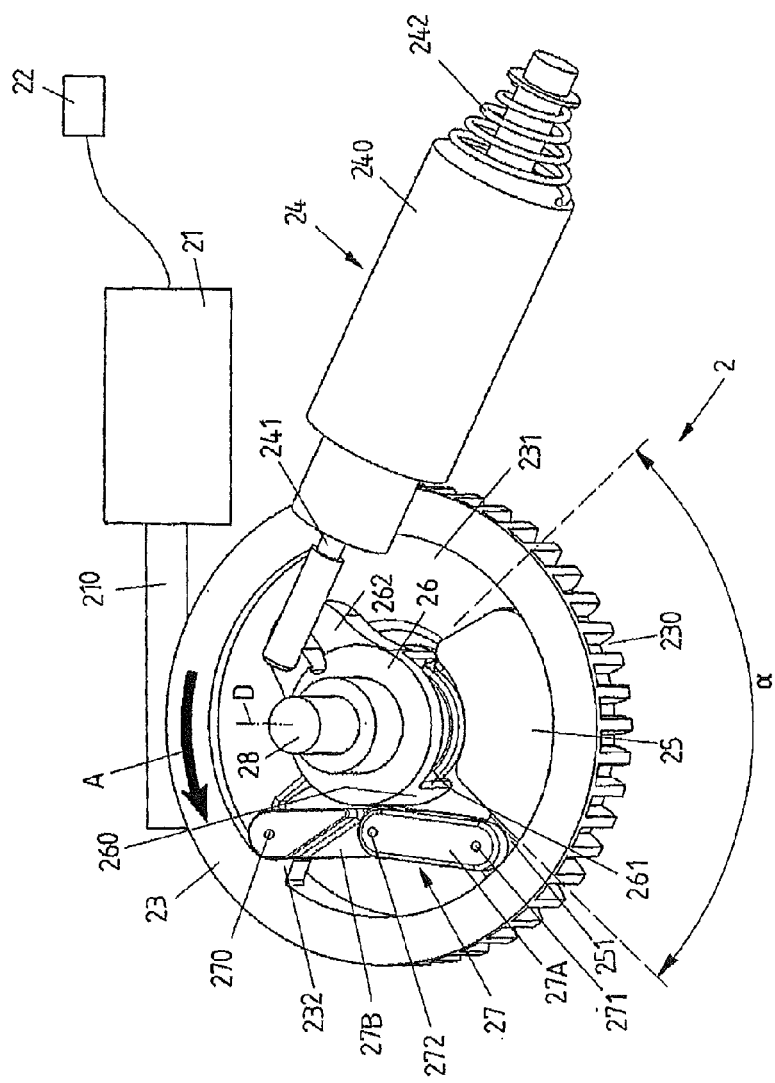

As schematically shown in FIG. 2A, the actuating drive 2 includes an electromotive driving device 21 in the form of an electric motor, which via a plug 22 is connected with the energy supply system 3 (see FIG. 1) of the vehicle F. The driving device 21 includes a rotatable drive shaft 210 which meshingly is in engagement with a drive gear 23 mounted on a shaft 28, which is rotatable about an axis of rotation D. On the drive shaft 210 a drive worm is formed for this purpose, which engages into an external toothing 230 of the drive gear 23 formed as spur gear.

The actuating drive 2 includes an output element 25 which is shiftably mounted on the drive gear 23 along a circumferential direction about the axis of rotation D and for this purpose is arranged on a sliding surface 231 of the drive gear 23.

The output element 25 is coupled with the drive gear 23 via a transmission element 27 in the form of a hinged lever. The transmission element 27 is formed by two levers 27A, 27B, of which the one lever 27B is pivotally coupled with the drive gear 23 via an articulation point 270 and the other lever 27A is pivotally coupled with a fastening point 251 of the output element 25 via an articulation point 271. The levers 27A, 27B in turn are pivotally connected with each other via a joint 272, so that the hinged lever is obtained, which permits a relative movement between the drive gear 23 and the output element 25, when the levers 27A, 27B can pivot relative to each other.

The output element 25 is coupled with slats 10 of the air passage device 1 and shifts the same between an open position, in which an air stream L can pass through the air passage device 1, and a closed position in which an air stream L largely is prevented (cf. FIG. 1). For this purpose, the output element 25, driven by the drive gear 23, can be shifted along an adjustment path α corresponding to an angular range of about 90°, so as to transmit an adjustment force and an adjusting movement onto the slats 10 of the air passage device 1, wherein an adjustment angle of 0° (cf. FIG. 2A) corresponds to a maximally open position of the air passage device 1 and an adjustment angle of about 90° (cf. FIG. 2D) corresponds to a maximally closed position of the air passage device 1.

On the shaft 28 of the drive gear 23 an adjusting element 26 is arranged, which is pivotable about the axis of rotation D relative to the drive gear 23 and the output element 25. The adjusting element 26 has a circularly cylindrical basic shape with a cylindrical circumferential shell surface 260, which on its circumference partly is interrupted by a cutout 261. An actuating rod 241 of an actuator 24 engages the adjusting element 26 via a lever element 262, which actuator serves for positioning the adjusting element 26 and for this purpose includes an electric lifting magnet 240 which acts on the actuating rod 241. Via a spring 242, the actuating rod 241 is biased in direction of a retracted position, corresponding to the position of the actuating rod 241 shown in FIG. 2A.

In cooperation with the adjusting element 26, the actuator 22 serves for controlling the transmission element 27 and hence for adjusting the coupling between the drive gear 23 and the output element 25. In particular, the adjusting element 26 with its cylindrical shell surface 260 and the cutout 261 arranged thereon is formed to support the transmission element 27, depending on the position of the adjusting element 26 and depending on the position of the output element 25 along its adjustment path α, for a power transmission between the drive gear 23 and the output element 25, as it is shown in FIG. 2A, or to permit a relative movement between the output element 25 and the drive gear 23 for providing a safety function, as will yet be explained in detail below in particular with reference to FIGS. 3A to 3D.

FIGS. 2A to 2D initially show the actuating drive 2 in a normal operation, in which, driven by the driving device 21, the drive gear 23 and together with the drive gear 23 the output element 25 is adjusted along the adjustment path α for adjusting the air passage device 1 along a direction of rotation A.

When, proceeding from the position as shown in FIG. 2A, the drive gear 23 initially is moved in direction of the direction of rotation A, the adjustment force introduced into the drive gear 23 is introduced into the output element 25 via the transmission element 27 and the output element is rigidly moved together with the drive gear 23. For this purpose, the joint 272 of the transmission element 27 is supported on the cylindrical shell surface 260 of the adjusting element 26, so that kinking of the transmission element 27 in the form of the hinged lever is not possible and hence the output element 25 is directly coupled with the drive gear 23 via the transmission element 27. Due to the fact that the lever 27B of the transmission element 27 additionally also is fixed against kinking in a direction pointing away from the adjusting element 26 via a wedge-shaped protrusion 232 radially protruding to the inside at the drive gear 23, the transmission element 27 is locked in place, so that the levers 27A, 27B cannot move relative to each other and establish the rigid connection of the drive gear 23 with the output element 25.

During an adjusting movement proceeding from a maximally open position of the air passage device 1, the actuator 24, as shown in FIG. 2A, initially is not energized, in order to save the energy expenditure otherwise required for this purpose. In normal operation, the actuator 24 is not energized as long as the output element 25 is located in a range of the adjustment path α in which the transmission element 27 with its joint 272 is supported on the cylindrical shell surface 260 of the adjusting element 26.

Figure 2B:
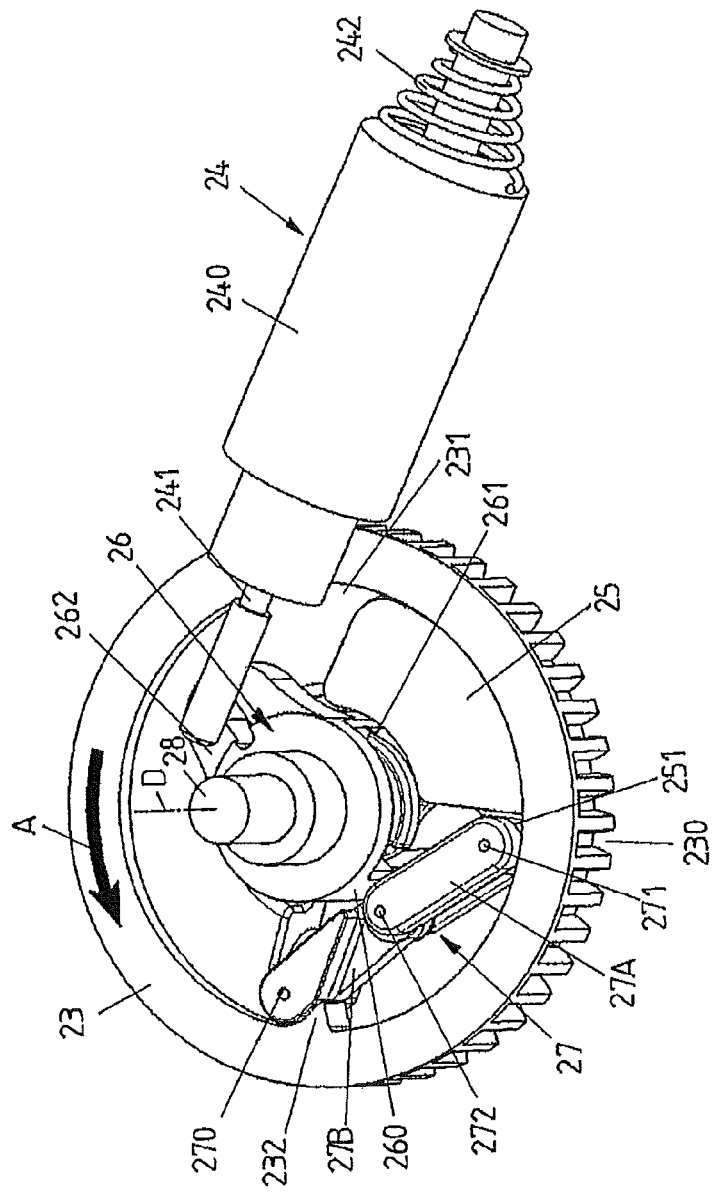

When the drive gear 23 is moved in the direction of rotation A, the output element also is moved and reaches the position shown in FIG. 2B, in which the air passage device 1 is partly closed. Because the joint 272 approaches the cutout 261 in the cylindrical shell surface 260 of the adjusting element 26, the actuator 24 is energized and the actuating rod 241 is extended in a direction B according to FIG. 2C, so that the adjusting element 26 gets into the position shown in FIG. 2C, in which the joint 272 of the transmission element 27 is supported on the shell surface 260 of the adjusting element 26 along the entire adjustment path α.

Due to the support on the adjusting element 26, the output element 25 in normal operation thus is directly coupled with the drive gear 23 along the entire adjustment path α and is moved with the drive gear 23 along the direction of rotation A.

For resetting the air passage device 1 driven by an electric motor the drive gear 23, driven by the driving device 21, is moved back against the direction of rotation A, and the output element 25 correspondingly is shifted back together with the drive gear 23. Instead of only energizing the actuator 24 when the output element 25 is moved out of a position corresponding to the open air passage device 1 (cf. transition from FIG. 2A to FIG. 2C), the actuator 24 also can be energized permanently in normal operation. This leads to electric losses at the actuator 24, but saves a sensor unit and controller for controlling the actuator 24 in dependence on the adjusting movement of the output element 25.

Figure 3A:
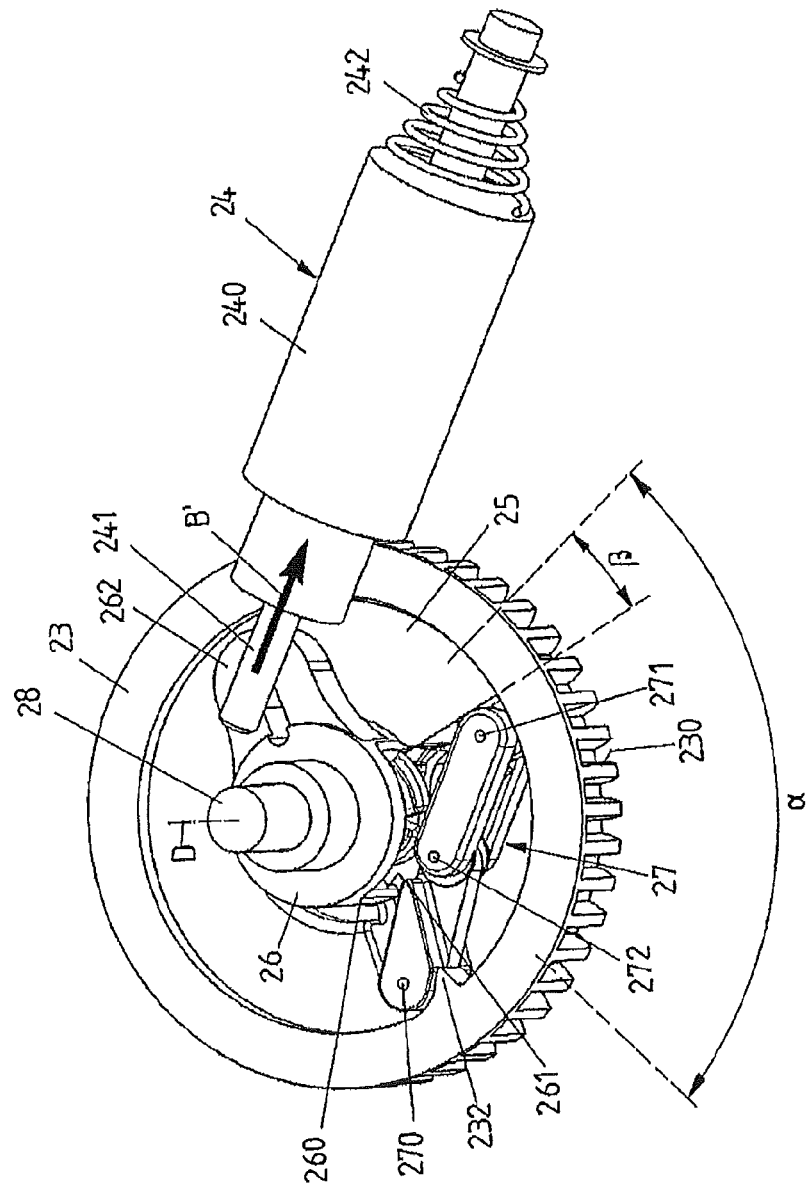

The actuator 24 generally shifts the adjusting element 26 in dependence on a voltage V, which is provided to the actuating drive 2 via the energy supply system 3 of the vehicle F. When a sufficient voltage V is applied at the actuating drive 2, the actuator 24 is energized (unless the output element 25 is in a position which corresponds to the open air passage device 1, cf. FIG. 2A). When no sufficient voltage V is applied at the actuating drive 2, the actuator 24 is not energized and the actuating rod 241 is retracted in a direction B', as is shown in FIG. 3A. In this way, the actuator 24 effects a decoupling of the output element 25 from the drive gear 23, in order to provide a safety function ("fail-safe" function) when a failure of a sufficient electrical supply of the actuating drive 2 is detected, for example because the voltage V has dropped below a predetermined limit value and in addition opening of the air passage device 1 is required, because the air passage device 1 with its slats 10 is in a closed or almost closed position. In this case, a relative movement of the output element 25 relative to the drive gear 23 should be made possible, in order to automatically return the slats 10 into an open position, for example under the influence of a suitable spring bias, in order to ensure an air stream L for cooling an engine to be cooled in the engine compartment R (see FIG. 1) of the vehicle F, even if the electrical supply of the actuating drive 2 has failed.

Decoupling the output element 25 from the drive gear 23 here is required, because the actuating drive 2 can be self-locking with a closed power transmission line between driving device 21 and output element 25, so that resetting without actuation of the driving device 21 is not possible or only with great difficulty. Such self-locking can be effected for example via the engagement of the drive shaft 210 into the drive gear 23 or via an additional transmission arranged between the driving device 210 and the drive gear 23.

When the voltage V provided by the energy supply system 3 drops, for example because the energy supply system as a whole has failed or the electrical connection between the energy supply system 3 and the actuating drive 2 is impaired, the electric lifting magnet 240 of the actuator 24 is not (no longer) energized and the actuating rod 241—due to the biasing spring 242—is shifted into the retracted position as shown in FIG. 3A. Together with the actuating rod 241 the adjusting element 26 coupled with the actuating rod 241 via the lever element 262 also is pivoted and gets into the position shown in FIG. 3A.

When in the case of a failure of the electrical supply and thus in the case of a related voltage drop the output element 25, as shown in FIG. 3A, is located in a portion β of the adjustment path α (see FIG. 3A), which corresponds to a closed or almost closed position of the air passage device 1, the joint 272 of the transmission element 27 gets into the region of the cutout 261 at the cylindrical shell surface 260 of the adjusting element 26, when the adjusting element 26 is shifted by retracting the actuating rod 241. The joint 272 thus no longer rests against the cylindrical shell surface 260 of the adjusting element 26 and hence no longer is radially supported by the adjusting element 26.

Figure 3C:
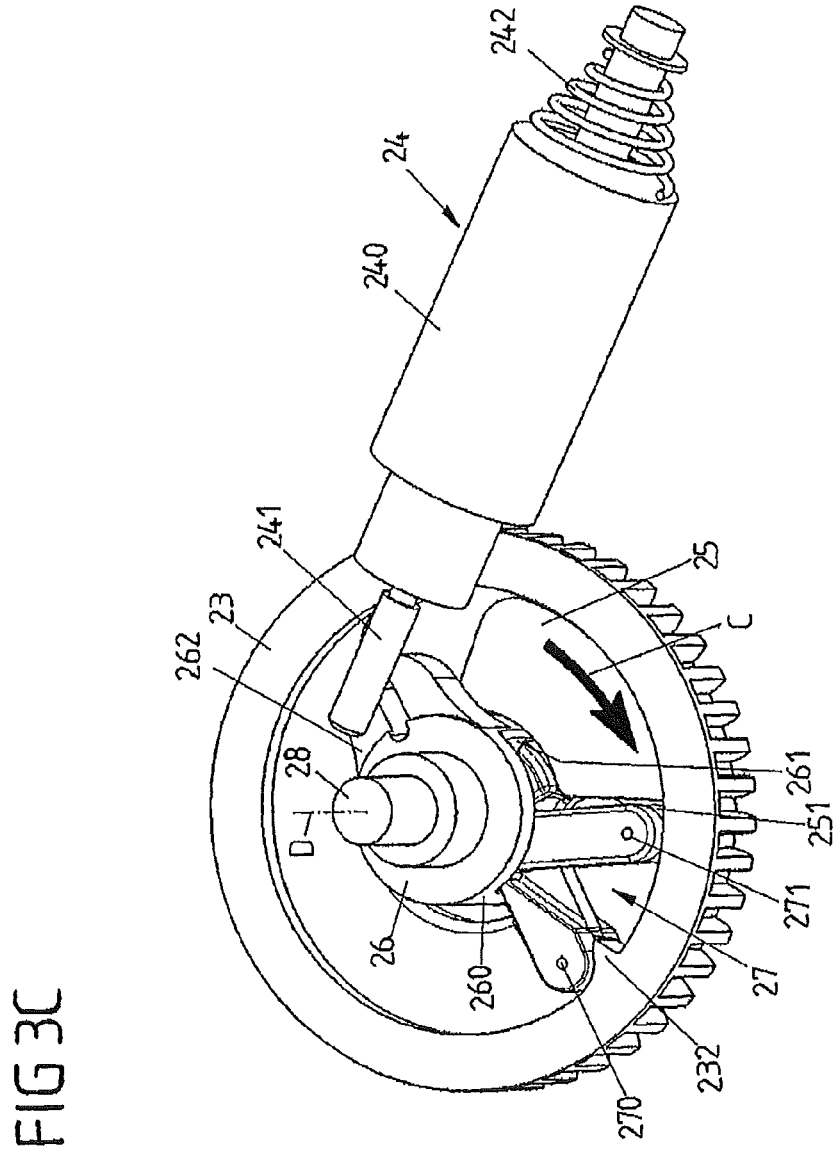
Figure 3D:
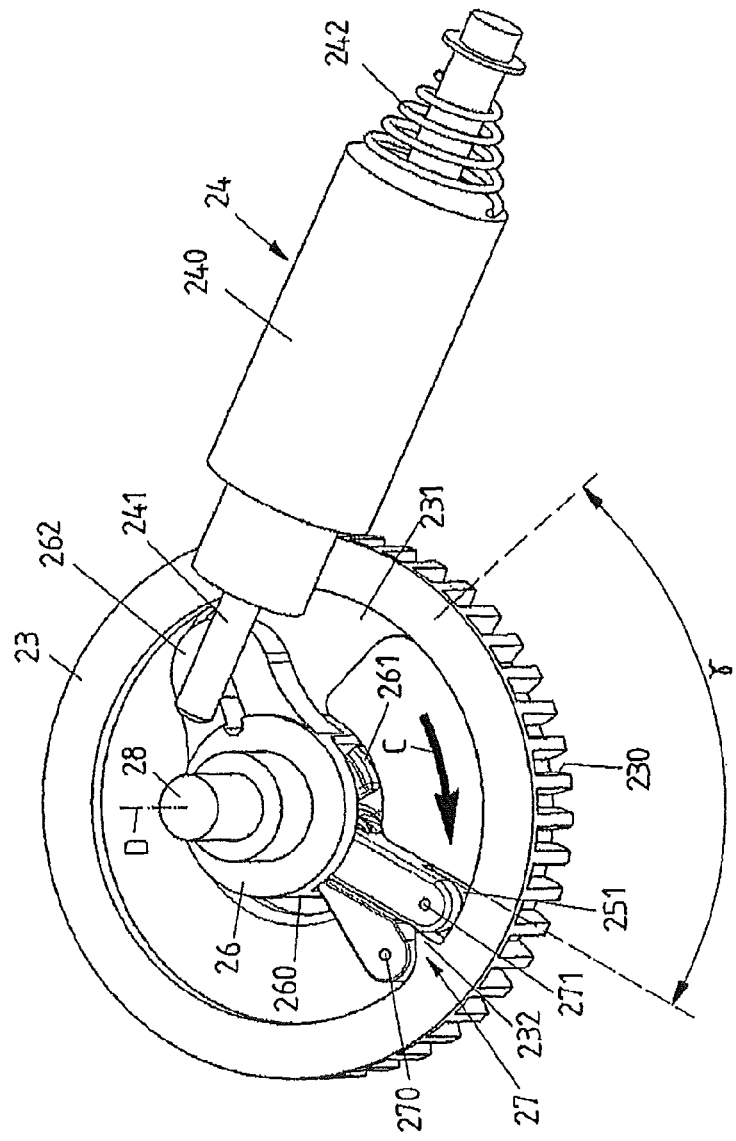

Rather, the transmission element 27 with its joint 272, as shown in FIGS. 3B, 3C and 3D, can immerse into the cutout 261 of the adjusting element 26, so that a movement in a direction C of the output element 25 relative to the drive gear 23 can be effected and the output element 25 thus can be moved with fixed drive gear 23. In this way, the output element 25 can be shifted in the direction C, in order to transfer the slats 10 of the air passage device 1 into an open position of the air passage device 1 and thus provide for an air stream L through the air passage device 1.

As shown in FIG. 3D, the output element 25 is movable with respect to the drive gear 23 by a maximum return path γ which is smaller than the adjustment path α in normal operation of the actuating drive 2. Due to the relative movement between the output element 25 and the drive gear 23, the air passage device 1 thus can be transferred into an at least largely open position with largely open slats 10.

Decoupling of the output element 25 and of the drive gear 23 thus is effected when two logical conditions are fulfilled. On the one hand, a drop of the electrical supply voltage V must be detected at the actuator 24, which indicates a failure of the electrical energy supply. Secondly, the output element 25 must be located in a portion β of the adjustment path α, which corresponds to a closed or at least largely closed air passage device 1. Only when these two logical conditions are fulfilled at the same time does the joint 272 get into the region of the recess 261 of the adjusting element 26, so that a relative movement between the output element 25 and the drive gear 23 is possible for the purpose of opening the air passage device 1.

The size of the portion β here can be chosen freely. For example, it can be provided that the adjustment path α describes an angular range of 90° and the portion β corresponds to an angular range of 45°. In other words, decoupling of the output element 25 from the drive gear 23 always is provided when the slats 10 of the air passage device 1 are closed for more than 45° (wherein 0° corresponds to an open position and 90° corresponds to a closed position of the slats 10).

When the output element 25—after a drop of the voltage V with a closed or almost closed air passage device 1 in connection with the safety function—has been moved relative to the drive gear 23 in the manner shown in FIGS. 3A to 3D, the actuating drive 2 must be brought back into a proper operational condition for resuming the normal operation. For this purpose, as shown in FIGS. 4A to 4C, the drive gear 23 is slowly moved back in the direction of rotation A' opposite to the direction of rotation A, so that the joint 272 is moved out of the cutout 261 of the adjusting element 26.

Figure 4B:
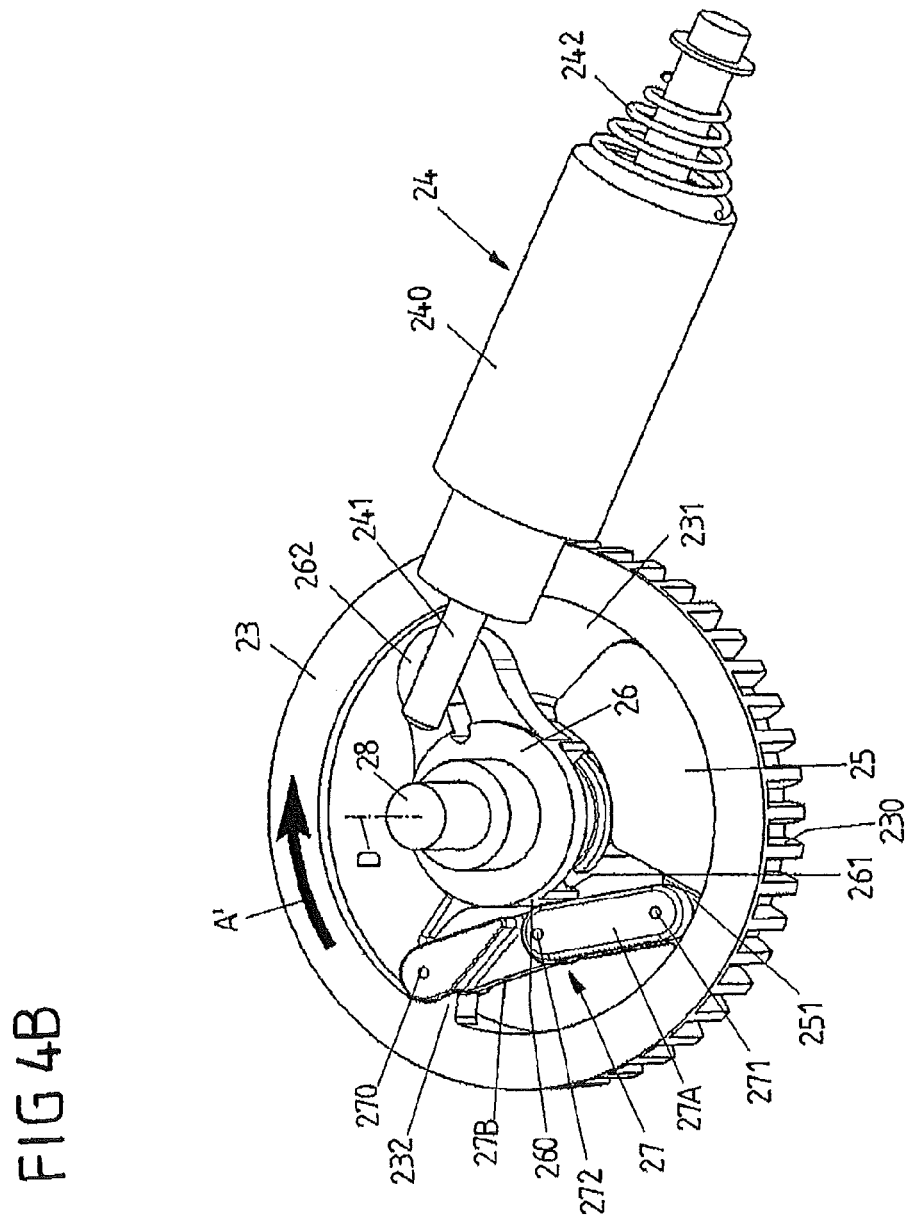
Figure 4C:
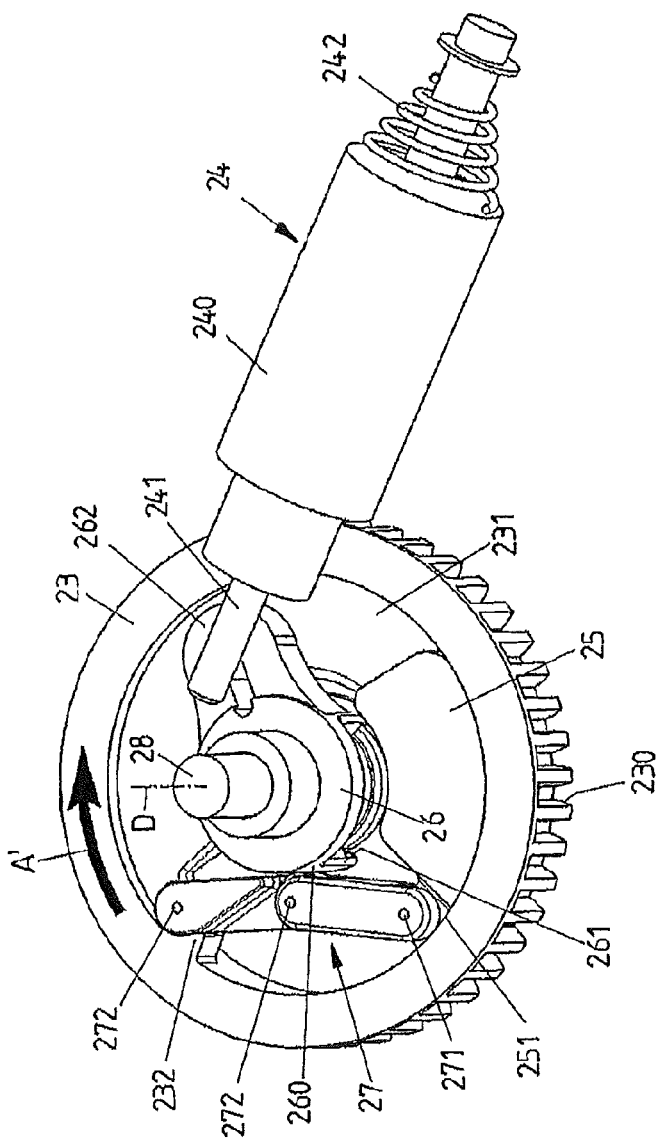

When the joint 272, as shown in FIG. 4B, no longer engages into the cutout 261, the actuating drive 2 gets back into the condition shown in FIG. 2A and thus into its normal operation in which shifting of the output element 25 is effected together with a rotary movement of the drive gear 23.

Figure 5:
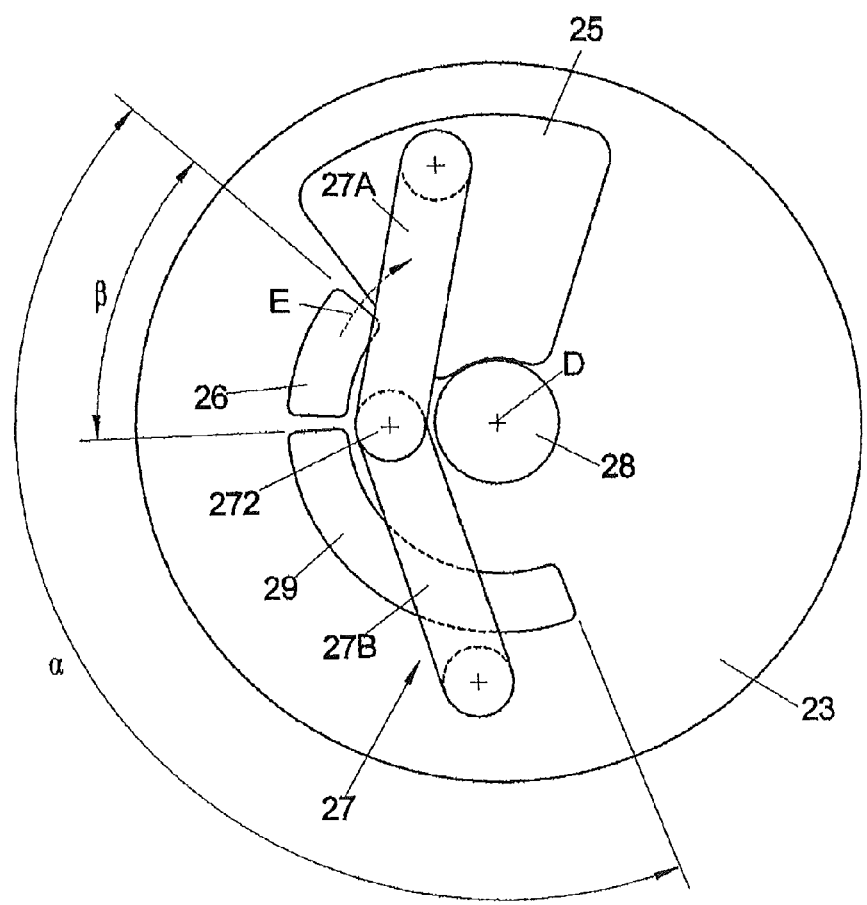
FIG. 5 shows a schematic view of a further exemplary embodiment of an actuating drive with a drive gear and an output element coupled with the drive gear via a transmission element in the form of a hinged lever.

In a further exemplary embodiment, schematically shown in FIG. 5, a drive gear 23 can be coupled with an output element 25 via a transmission element 27 in the form of a hinged lever. Components of the same function, as also in the following, are designated with the same reference numerals as above, as far as this is expedient.

In the exemplary embodiment of FIG. 5—in contrast to the exemplary embodiment described above with reference to FIG. 2 to FIG. 4—the transmission element 27 formed by two levers 27A, 27B coupled with each other via a joint 272 is designed such that in dependence on the position of an adjusting element 26 it can or cannot evade to the outside.

The mode of operation of the schematically illustrated actuating drive is such that in the position of the adjusting element 26 as shown in FIG. 5 the drive gear 23 is directly coupled with the output element 25 during a movement of the drive gear 23 about an axis of rotation D, in that the joint 272 of the transmission element 27 is supported to the outside by a guideway 29 firmly arranged on a housing of the actuating drive and by the adjusting element 26. When the drive gear is shifted along its adjustment path α, the joint 272 of the transmission element 27 slides along the inside of the guideway 29 or the adjusting element 26, so that the joint 272 cannot evade to the outside and a direct connection of the output element 25 with the drive gear 23 is established. Correspondingly, the output element 25 is moved and shifted with the drive gear.

The adjusting element 26, however, is rotatably mounted about the axis of rotation D and can be shifted in a direction E. When the adjusting element 26 is shifted in the direction E, the joint 272 no longer is supported towards the outside in a portion β of the adjustment path 26 and hence is released, so that a relative movement between the output element 25 and the drive gear 23 in the manner described above is possible.

In the exemplary embodiment shown in FIG. 5, the transmission element 27 in the form of the hinged lever thus can evade to the outside, in order to provide for a relative movement between the output element 25 and the drive gear 23. The mode of operation of the actuating drive otherwise is similar to the one described above for the exemplary embodiment of FIGS. 2 to 4, so that reference will be made thereto.

Figure 6:
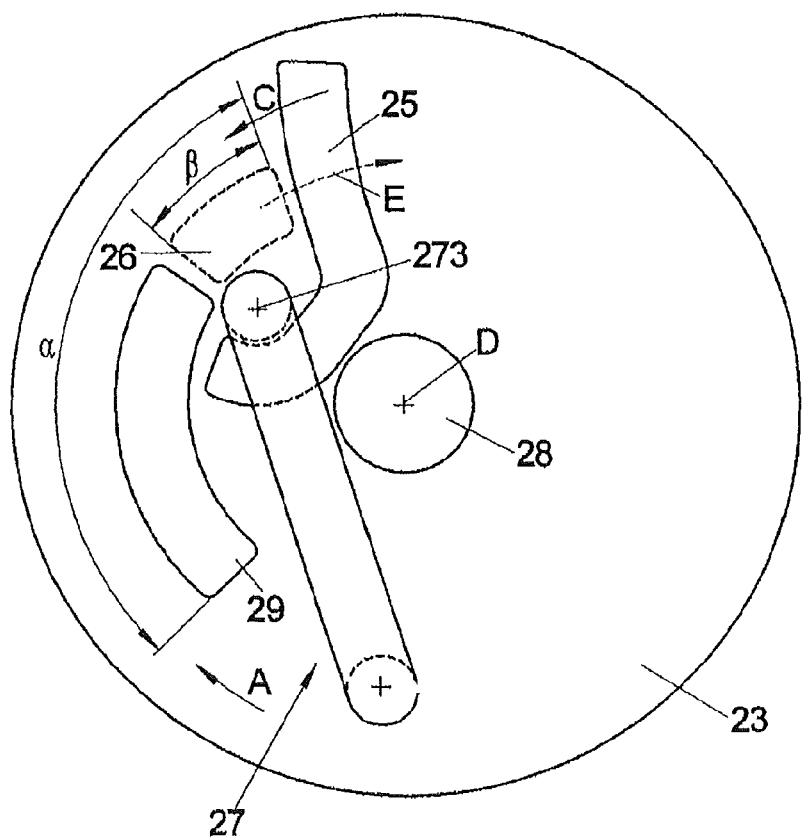
FIG. 6 shows a further exemplary embodiment of an actuating drive with a drive gear and an output element which is coupled with the drive gear via a push rod.

In the exemplary embodiment shown in FIG. 6, a push rod is used as transmission element 27 instead of a hinged lever, which push rod couples a drive gear 23 with an output element 25. The transmission element 27 in the form of the push rod is supported on the adjustment path of the drive gear 23 towards the outside via a housing-mounted guideway 29 and—in the position of an adjusting element 26 as shown in FIG. 6—supported on the adjusting element 26, so that the transmission element 27 in the form of the push rod cannot evade to the outside and provides a direct, rigid connection of the drive gear 23 with the output element 25 (the output element 25 and the drive gear 23 are located in different planes; the output element 25 is movable relative to the drive gear 23, when the rigid coupling via the push rod is eliminated).

When the adjusting element 26 is in the position shown in FIG. 6, the output element 25 is moved together with the drive gear 23 during a movement of the drive gear 23, in that during a movement of the drive gear 23 in the direction A the transmission element 27 in the form of the push rod acts on the output element 25 via a coupling element 273 arranged at the end of the push rod and pushes the same before itself. When the drive gear 23 moves against the direction A, it correspondingly pulls the output element 25 with itself. The output element 25 thus is moved along the adjustment path α together with the drive gear 23.

When the adjusting element 26 however is moved in a direction E about the axis of rotation D and the transmission element 27 in the form of the push rod at its coupling end 273 thus is released radially to the outside in the portion β of the adjustment path α, the transmission element 27 can evade to the outside in this portion β and slide along the output element 25 formed in the manner of a curved guideway. When the drive gear 23 thus is in a position in which the coupling end 273 of the transmission element 27 comes to lie in the portion β of the adjustment path α, the transmission element 27 with the coupling end 273 can evade to the outside, when the adjusting element 26 is shifted in the direction E for releasing the coupling end 273, so that the output element 25 is movable in the direction C relative to the drive gear 23. During a movement of the output element 25 in the direction C, the transmission element 27 with its coupling end 273 slides along the output element 25, so that a movement of the output element 25 in the direction C is not prevented.

In a further exemplary embodiment, shown in FIG. 7, a transmission element 27 in the form of a push rod in turn is used, which via a coupling end 273 in a coupling condition engages into a cutout 252 of an output element 25 and at its end facing away from the coupling end 273 is pivotally connected with a drive gear 23, which is arranged in an axial plane other than the output element 25.

The drive gear 23 and the output element 25 both are rotatably mounted about the axis of rotation D. An adjusting element 26 likewise is rotatably arranged about the axis of rotation D and includes a cutout 261 which is shiftable along a direction E relative to the output element 25 and in particular its cutout 252. When the cutout 261 with its radially inner opening 263 is located in the region of the cutout 252, the coupling end 273 can immerse into the cutout 261 and hence release the coupling between the drive gear 23 and the output element 25, so that the output element 25 is movable relative to the drive gear 23.

The mode of operation of the actuating drive otherwise is identical to the one described above. Merely the coupling of the drive gear 23 with the output element 25 is designed differently.

Figure 8A:
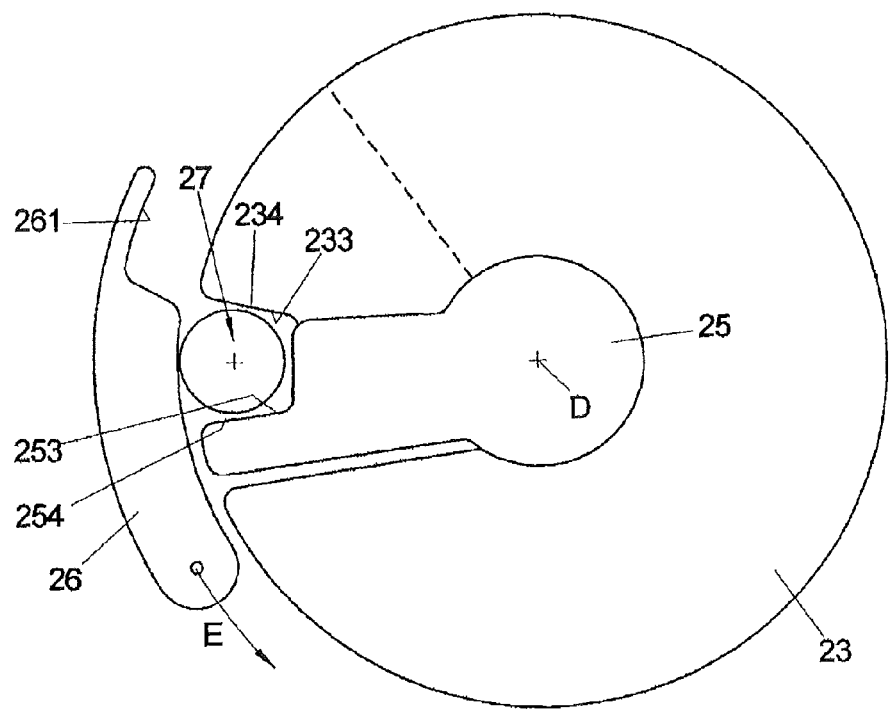
FIG. 8A shows a schematic view of a further exemplary embodiment of an actuating drive, in which a drive gear and an output element can be coupled with each other via a transmission element in the form of a ball.
Figure 8B:
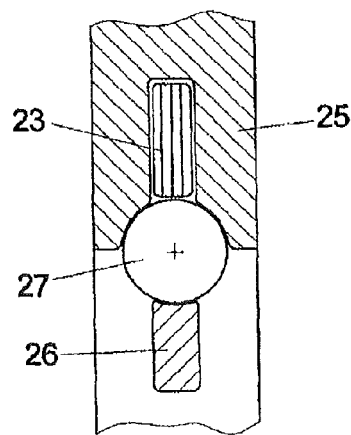
FIG. 8B shows a sectional view along line I-I of FIG. 8A.

In an exemplary embodiment shown in FIGS. 8A and 8B, a drive gear 23 is coupled or not coupled with the output element 25 via a transmission element 27 in the form of a ball, depending on the position of an adjusting element 26. The drive gear 23 and the output element 25 both are rotatable about an axis of rotation D, just like the adjusting element 26.

In the position shown in FIG. 8A, the drive gear 23 and the output element 25 are directly and rigidly coupled with each other via the transmission element 27 in the form of a ball, so that during a movement of the drive gear 23 about the axis of rotation D the output element 25 will also be moved.

As can be taken from the sectional view of FIG. 8B, the transmission element 27 in the form of the ball is supported to the outside by the adjusting element 26, so that the ball 27 cannot get out of a cutout 233, 253, which is formed at the drive gear 23 and the output element 25. In this case, the transmission element 27 in the form of the ball lies between edge portions 234, 254 of the drive gear 23 on the one hand and of the output element 25 on the other hand, so that a direct connection of the output element 25 with the drive gear 23 is established in circumferential direction about the axis of rotation D.

When the adjusting element 26 is shifted in the direction E about the axis of rotation D, the transmission element 27 in the form of the ball gets into the region of a cutout 261 at the adjusting element 26, so that the ball can evade to the outside, in order to eliminate the coupling between the output element 25 and the drive gear 23, so that the output element 25 can be moved relative to the drive gear 23.

As can be taken from the sectional view of FIG. 8B, the output element 25 is mounted on the drive gear 23, in that the drive gear 23 slidingly engages into a pocket-like formation at the output element 25.

The schematic views of FIGS. 5 to 8 show possible variants of the coupling of the drive gear 23 with the output element 25. The actual function of the actuating drive is identical to the one described with reference to FIGS. 2 to 4. In particular, in all variants the adjusting element 26 is shiftable via an actuator in dependence on a detected error condition.

FIGS. 9A, 9B to 12A-12F show views of a further exemplary embodiment of an actuating drive 2 of an air passage device, which is formed to provide a fail-safe function and in its mode of operation resembles to the exemplary embodiment of FIGS. 2 to 4. Components of the same function correspondingly, as far as expedient, will be provided with the same reference numerals.

As can be taken from the exploded views of FIGS. 9A and 9B, the actuating drive 2 includes a driving device 21 in the form of an electric motor, which via a drive shaft 210 and a worm 211 arranged thereon is in engagement with a transmission gear 23a. Via a further transmission gear 23b (in the views of FIGS. 9A and 9B arranged at the back of the transmission gear 23a and therefore not visible) firmly connected with the transmission gear 23a, the transmission gear 23a is in engagement with a transmission gear 23c, which in turn is firmly connected with a transmission gear 23d. Via the transmission gear 23d the transmission gear 23c is in engagement with a drive gear 23 via its toothing 230.

The transmission gears 23a, 23b as well as the drive gear 23 and an adjusting element 26 as well as an output element 25 are rotatably mounted about a shaft 28 arranged at the housing 20. The transmission gears 23c, 23d on the other hand are rotatably mounted on a different shaft 28a of the housing 21, which is offset to the shaft 28.

The drive gear 23, analogous to the exemplary embodiment of FIGS. 2 to 4, is coupled with the adjusting element 26 via a transmission element 27 in the form of a toggle lever formed of levers 27a, 27b, wherein the transmission element 27 with its articulation point 270 is articulated to a fastening point 232 of the drive gear 23 and with its articulation point 271 to a fastening point 251 of the output element 25.

The adjusting element 26 is coupled with the drive gear 23 via a spring 266, which with one end engages a fastening point 265 of the adjusting element 26 and with another end a fastening point 235 of the drive gear 23. The spring 266 is designed as leg spring and serves to bias the adjusting element 26 with respect to the drive gear 23 depending on the position of the drive gear 23 relative to the adjusting element 26, as will yet be explained in detail below.

FIGS. 10A to 10F show the normal operation of the actuating drive 2. In operation, the driving device 21 drives the drive gear 23 via the transmission gears 23a-23d and puts the same into a rotary movement about the shaft 28 (in FIG. 10A in anticlockwise direction). Via the transmission element 27, the drive gear 23 transmits an adjustment force to the output element 25, which thus likewise is rotated about the shaft 28 with the drive gear 23 in a forcedly coupled manner (i.e. likewise in anticlockwise direction). The forced coupling of the output element 25 with the drive gear 23 is established via the transmission element 27 in the form of a toggle lever which with its joint 272 connecting the levers 27A, 27B rests against a sectionally cylindrical shell surface 260 of the adjusting element 26 (see FIG. 9A) and correspondingly cannot evade radially to the inside, so that via the transmission element 27 the output element 25 is moved together with the drive gear 23.

Figure 10A:
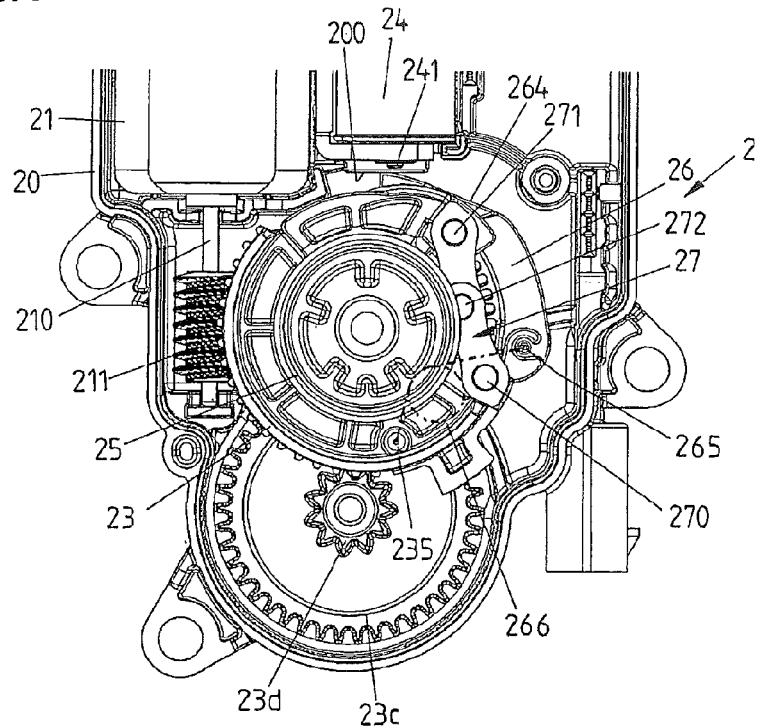
Figure 10B:
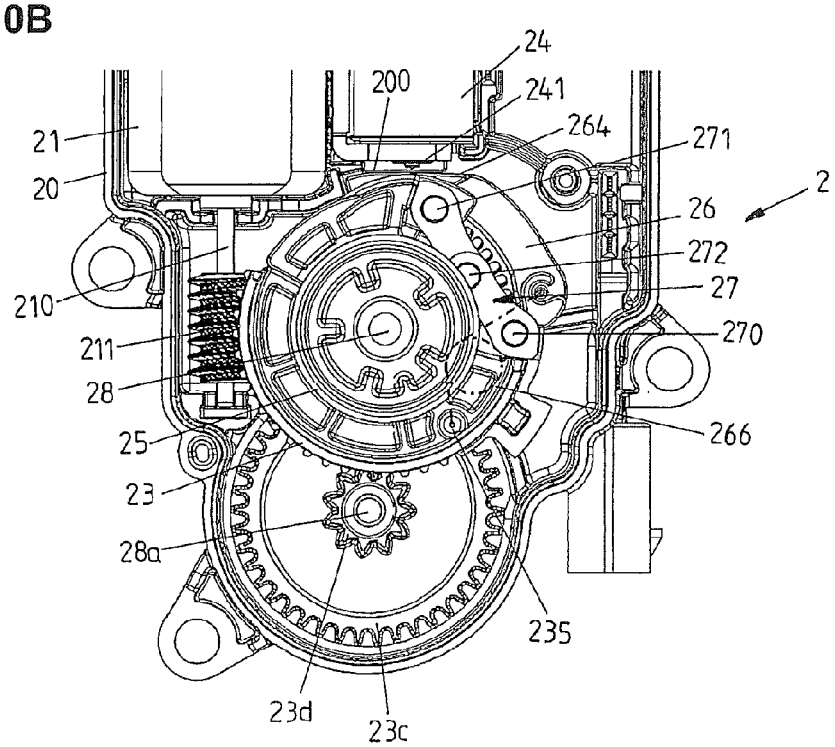

At the beginning of the adjusting movement, the adjusting element 26 is moved from the starting position shown in FIG. 10A into a support position shown in FIG. 10B, in which a support surface 264 of the adjusting element 26 is in contact with a stop 200 of the housing 20. The movement of the adjusting element 26 is effected driven by the spring 266, which upon movement of the drive gear 23 introduces an adjustment force into the adjusting element 26 and moves the same from the position shown in FIG. 10A into the support position shown in FIG. 10B.

During the further movement of the drive gear 23, the output element 25—as shown in FIGS. 10C, 10D and 10E— also is moved, until the output element 25 reaches the position shown in FIG. 10F, in which an air passage device, a part of which is the actuating drive 2, is maximally closed.

Via the transmission element 27, the output element 25 is moved with the drive gear 23 in a synchronous way. Along the entire adjustment path of the output element 25, the adjusting element 26 establishes a coupling of the drive gear 23 with the output element 25.

As can be taken from FIGS. 10D, 10E and 10F, the adjusting element 26 is retained in its support position during the movement of the drive gear 23 for moving the output element 25, due to the abutment of the support surface 264 at the stop 200. Thus, there is produced a movement of the drive gear 23 relative to the adjusting element 26. This relative movement leads to the fact that the relative position of the fastening points 235, 265 of the spring 266 at the drive gear 23 on the one hand and the adjusting element 26 on the other hand move towards each other, so that the spring 266 moves from the position shown in FIG. 10D into the position shown in FIG. 10F.

As a result of the change in position the spring 266 is rotated, which leads to the fact that the direction of the biasing force acting between the drive gear 23 and the adjusting element 26 is reversed. In FIG. 10D the biasing force of the spring 266 acts on the adjusting element 26 such that the same is pressed in direction of its support position and thus in contact with the stop 200. In the position of the spring 266 as shown in FIGS. 10E and 10F, however, the biasing force acts on the adjusting element 26 such that it is loaded out of the support position.

To hold the adjusting element in the support position when the action of the spring force is reversed and thus couple the drive gear 23 with the output element 25 in normal operation, a shank 241 of an actuator 24 in the form of a lifting magnet is extended and engages into a cutout 267 (see FIG. 9A) of the adjusting element 26, so as to lock the adjusting element 26 in its support position. This is shown in the transition from FIG. 10D to FIG. 10E: in the position shown in FIG. 10D the shank 241 still is retracted; in the position shown in FIG. 10E the shank 241 is extended. The actuation of the actuator 24 is effected depending on the angular position of the drive gear 23, so that the adjusting element 26 is locked in its support position by engagement of the shank 241, as soon as the drive gear 23 is locked in a predetermined angular position (which depends on the place of the force reversal of the spring 266).

When the output element 25 is to be moved for opening the air passage device, the movement is effected exactly the other way round.

The actuator 24 serves to lock the adjusting element 26 in the support position by means of its shank 241. When the shank 241 is extended in normal operation of the actuating drive 2, as shown in FIGS. 10E and 10F, the adjusting element 26 cannot get out of its support position. The drive gear 23 thus is coupled with the output element 25, so that the output element 25 is moved together with the drive gear 23.

Figure 11A:
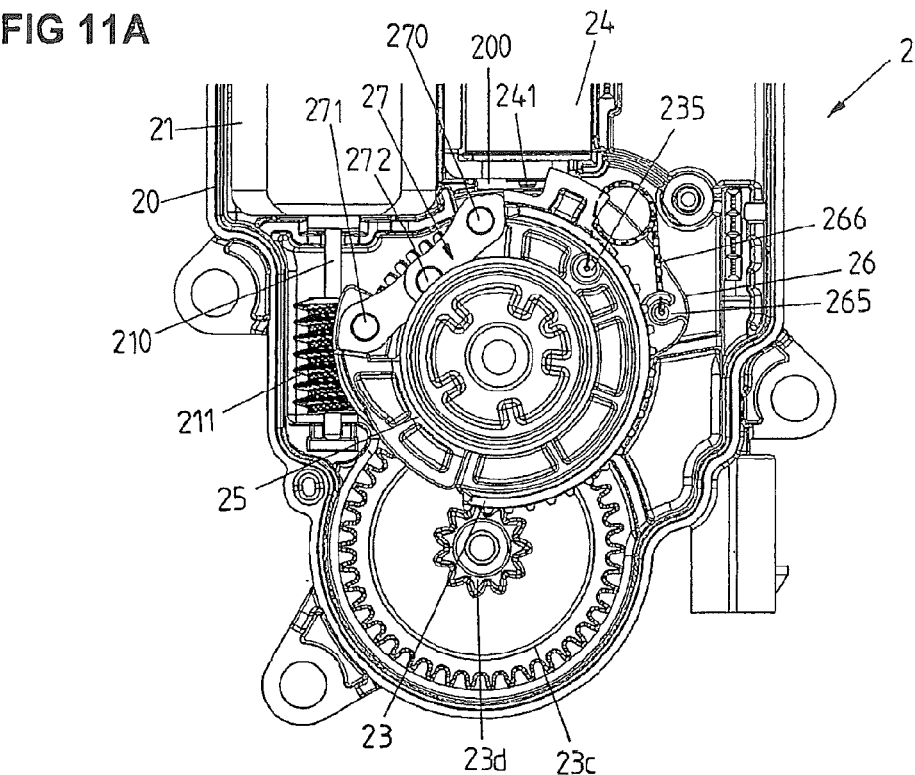
Figure 11B:
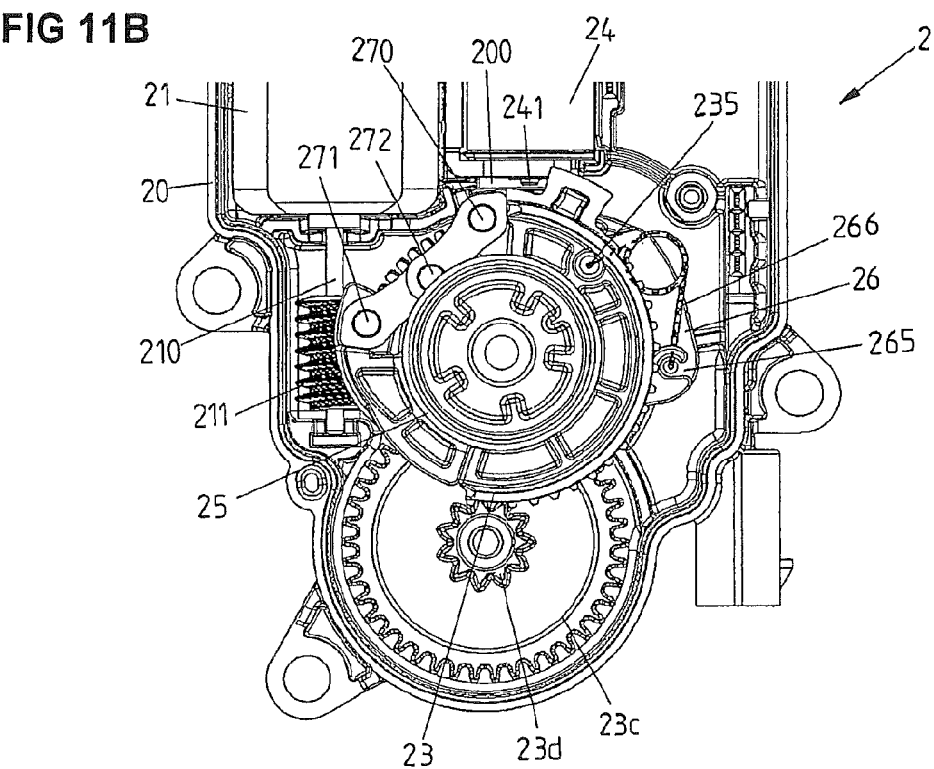

The actuator 24 serves to provide a fail-safe function, similar to the one already described above with reference to the exemplary embodiment of FIGS. 2 to 4. When for example in the case of a failure of the energy supply system of a vehicle the shank 241 is retracted, while the output element 25 is in the position shown in FIG. 10E or 10F, the adjusting element 26 no longer is locked in its support position and is pressed out of its support position due to the spring action of the spring 266, as is shown in FIGS. 11A and 11B. This leads to the fact that the joint 272 gets into the region of a cutout 261 (see FIG. 9A: the cutout 261 corresponds to the end of the cylindrical shell surface 260) of the adjusting element 26, so that the transmission element 27 can immerse into the cutout 261 with its joint 272 and the output element 25 therefore no longer is firmly coupled with the drive gear 23.

The output element 25 thus is movable relative to the drive gear 23, in that the transmission element 27 can immerse into the cutout 261 with its joint 272, as is shown in FIGS. 11C and 11D. Due to the free movability of the output element 25, the air passage device can be opened in connection with a fail-safe function, for example when the energy supply system of the vehicle fails, so that the air passage device can be opened, in order to provide an air stream for cooling an engine compartment also when the energy supply has failed.

Decoupling the output element 25 from the drive gear 23 only is effected when the output element 25 is located in a predetermined portion of the adjustment path, which corresponds to a closed or almost closed air passage device. In the exemplary embodiment of FIGS. 9-12 this portion of the adjustment path is defined in that in this portion the spring 266 effects a reverse bias between the adjusting element 26 and the drive gear 23, corresponding to a bias out of the support position (in FIGS. 11A-11B in clockwise direction).

When the output gear 25 is located outside this predetermined portion of the adjustment path, the spring 266 acts on the adjusting element 26 in direction of the support position. In this portion of the adjustment path, the shank 241 of the actuator 24 anyway has not yet been extended, so that a failure of the energy supply has no influence on the actuating drive 2 and in particular does not effect a decoupling of the output element 25 from the drive gear 23.

Once the actuating drive 2 has reached the position shown in FIG. 11B in connection with the fail-safe function, the drive gear 23 and the output element 25 in turn must be shifted relative to each other, in order to bring the actuating drive 2 back into a proper operational condition. In the case of the actuating drive 2 this can be effected automatically, in that the drive gear 23, as shown in FIGS. 12A-12F, is rotated relative to the output element 25 in direction of its starting position. The transmission element 27 in the form of the toggle lever thereby is pulled apart, the joint 272 thereby gets out of engagement with the cutout 261 and gets back into its proper operational condition coupling the drive gear 23 with the output element 25 (see the transition from FIG. 12A to 12G).

Figure 12A:
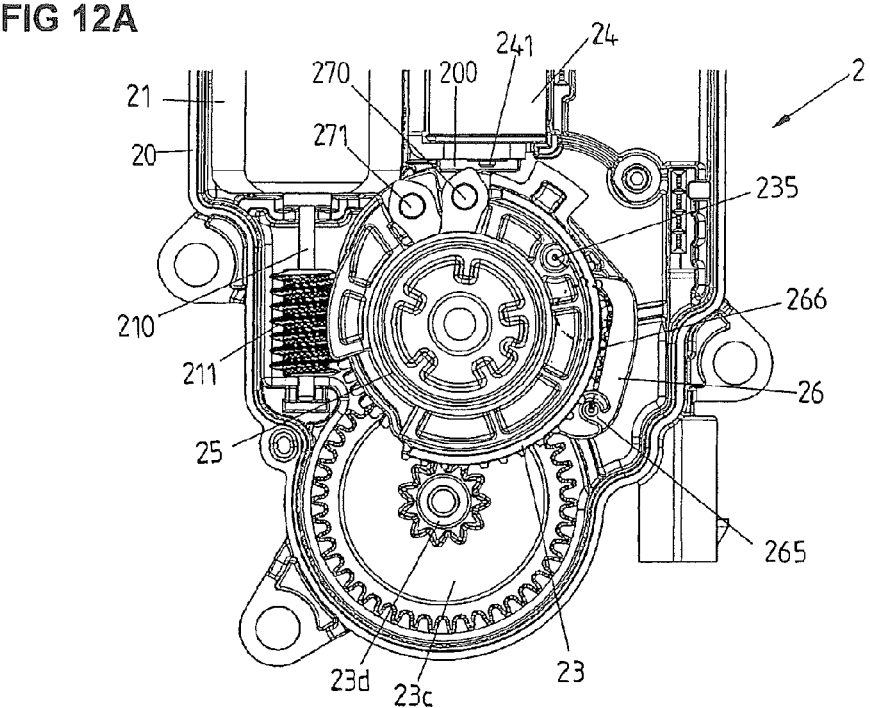
FIGS. 12A-12F show views of the actuating drive, representing the return of the actuating drive into a proper operational condition after a relative movement of the output element relative to a drive gear of the actuating drive.
Figure 12B:
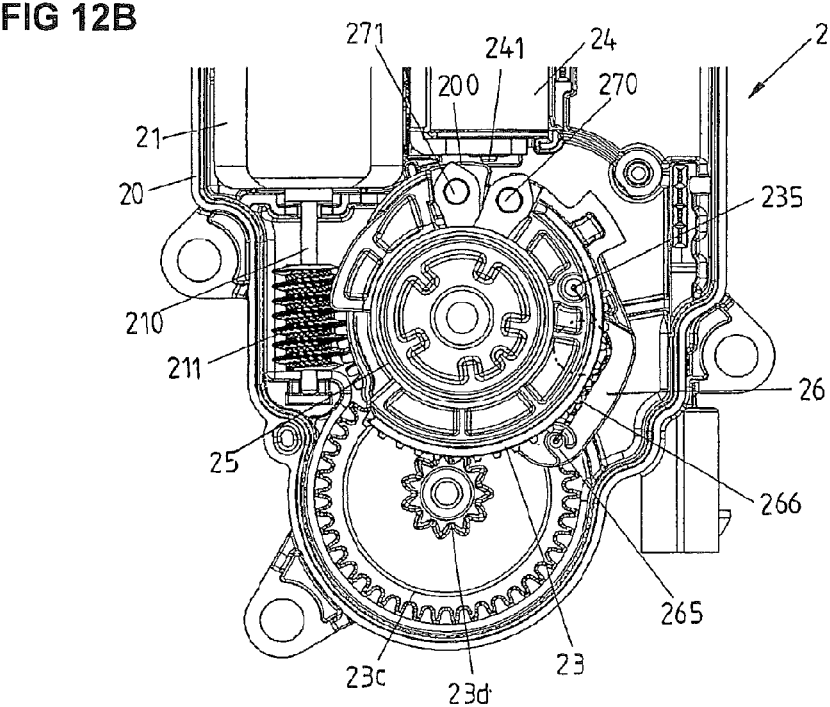
Figure 12C:
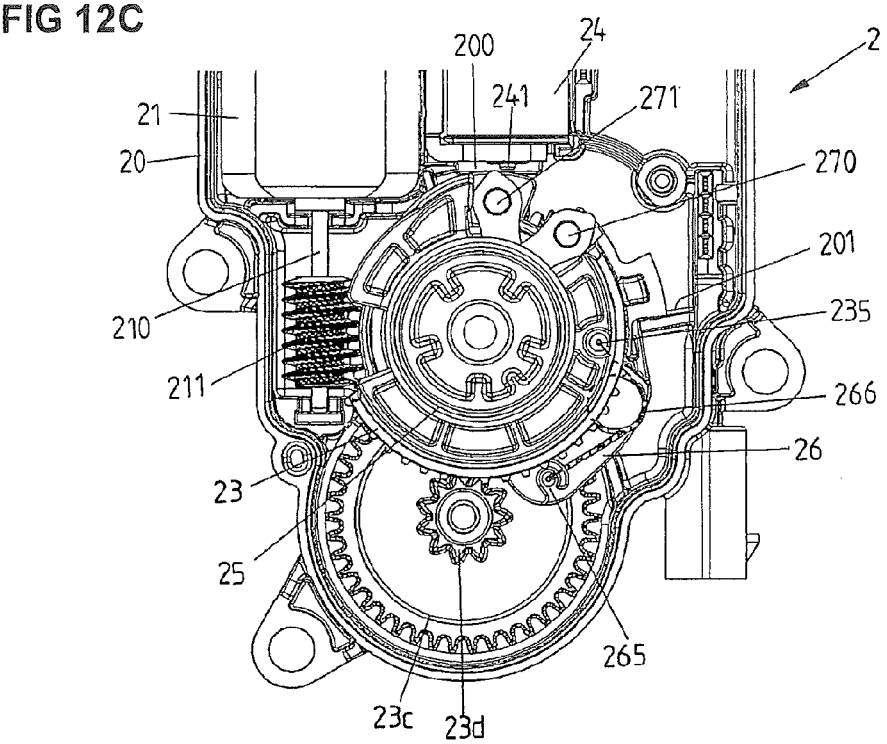
Figure 12D:
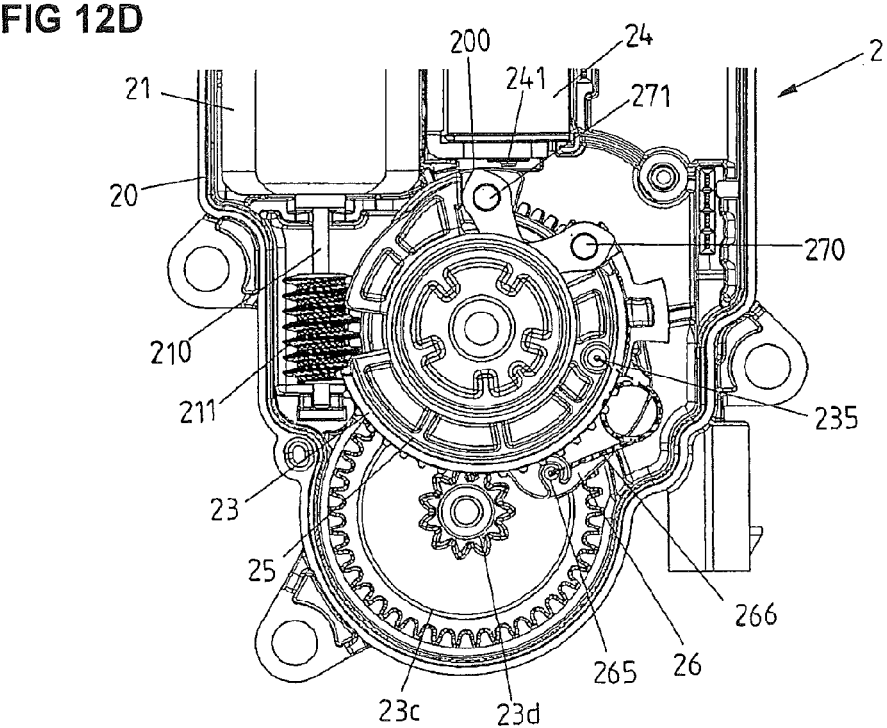
Figure 12E:
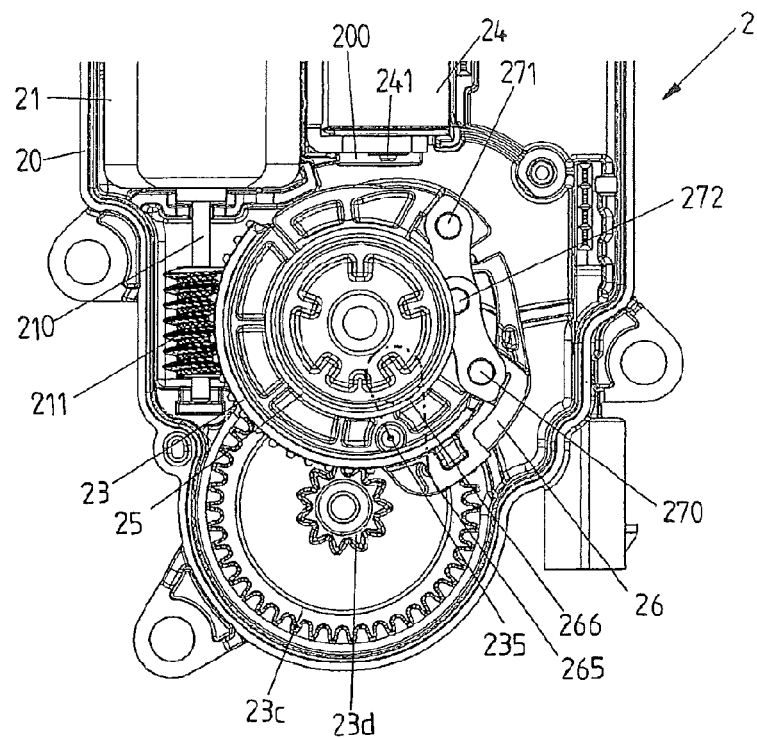

When shifting the drive gear 23, the adjusting element 26 initially is moved together with the drive gear 23, as can be taken from the transition from FIG. 12A to 12D, because on the one hand the transmission element 27 with its joint 272 still engages into the cutout 261 and in addition the spring 266 rotates the adjusting element 26 together with the drive gear 23. In the angular position of the adjusting element 26 as shown in FIG. 12C, the adjusting element 26 with its cutout 267 abuts against a housing-mounted stop 201, so that the adjusting element 26 is retained and will no longer be moved during a further rotary movement of the drive gear 23. Correspondingly, the position of the spring 266 is changed, as shown in FIGS. 12B and 12E, so that approximately from the position as shown in FIG. 12E a reversal of direction of the biasing force between the drive gear 23 and the adjusting element 26 occurs and the adjusting element 26 is moved back by a certain adjustment path in direction of its support position (see FIG. 12F). The cutout 261 of the shell surface 260 of the adjusting element 26 thereby gets out of the region of the joint 272 of the transmission element 27, so that the transmission element 27 with its joint 272 in turn is supported on the shell surface 260 of the adjusting element 26 and the drive gear 23 thus in turn is firmly coupled with the output element 25.

Figure 12F:
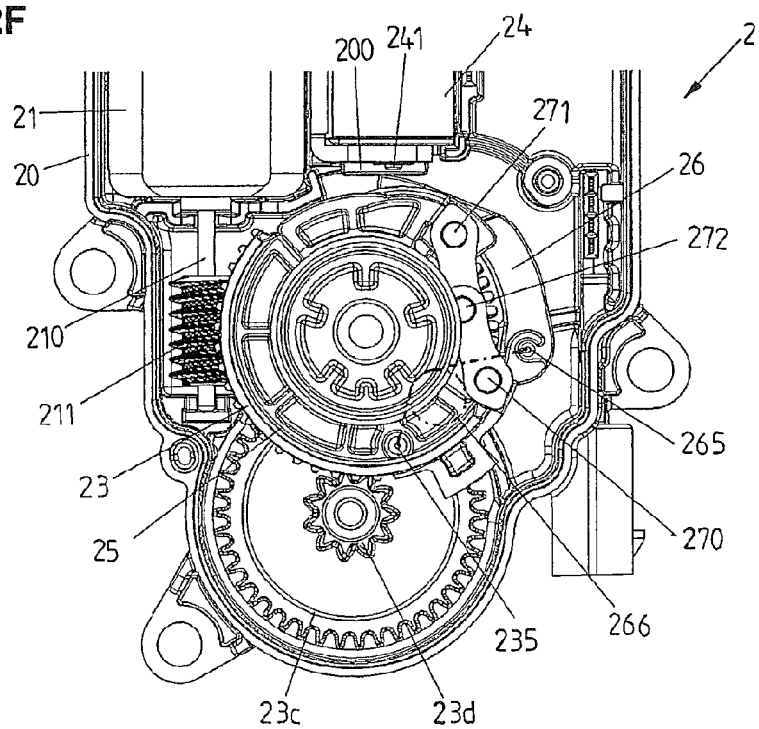

The position shown in FIG. 12F corresponds to the starting position as shown in FIG. 10A, so that the actuating drive 2 has been returned into its proper operational condition and again can resume its normal operation.

The idea underlying the invention is not limited to the exemplary embodiment described above, but can also be realized in principle in completely different embodiments. With the present invention a transmission element is provided for coupling a drive gear with an output element, which in dependence on different logical conditions provides a direct connection of the drive gear with the output element or, in particular in the case of a failure of a voltage supply of the actuating drive, provides for a relative movement between the output element and the drive gear, in order to provide for resetting an air passage device controlled by the actuating drive into an open position and in this way ensure a sufficient air cooling of a component to be cooled even in the case of a failure of an energy supply of the actuating drive.

Instead of rotatably arranging the adjusting element 26 about the axis of rotation D, as in the exemplary embodiments described above, the adjusting element also can be shiftable axially to the axis of rotation D, so as to release or fix the transmission element 27 for establishing the operative connection between the drive gear 23 and the output element 25—depending on the axial position of the adjusting element 26.

Instead of a transmission element in the form of a hinged lever, it is also conceivable to provide a pneumatically actuatable transmission element for example in the form of an air bellows or the like. In a first pneumatic condition, for example with inflated air bellows, the transmission element provides a connection between the drive gear and the output element. In a second condition, for example with deflated air bellows, a relative movement between the drive gear and the output element is possible.

The invention claimed is:

1. An actuating drive of an air passage device for an engine cooling system of a vehicle, the actuating drive comprising:
    a drive gear configured to be driven by an electric motor, the drive gear being rotatable about an axis of rotation,
    an output element which is operatively connected with the drive gear and is movable with the drive gear along an adjustment path in order to shift the air passage device between an open position, in which the air passage device is opened in order to allow an air stream to pass through, and a closed position in which the air passage device is closed in order to minimize an air stream,
    a transmission element arranged between the drive gear and the output element for establishing the operative connection between the drive gear and the output element, and
    an actuator which cooperates with the transmission element such that in a first position of the actuator the output element is directly coupled with the drive gear for movement along the adjustment path and in a second position of the actuator, at least when the output element is located in a predetermined portion of the adjustment path, the output element is movable relative to the drive gear,
    wherein the output element is shiftably mounted on the drive gear along a circumferential direction about the axis of rotation, and
    wherein the transmission element is formed by two levers pivotally connected with each other via a joint, wherein one lever is pivotally connected with the drive gear via a first articulation point and another lever is pivotally connected with the output element via a second articulation point.

2. The actuating drive according to claim 1, wherein the actuator is shiftable between the first position and the second position in dependence on a voltage condition of a voltage applied at the actuating drive.

3. The actuating drive according to claim 1, wherein the transmission element is arranged in a flux of force between the drive gear and the output element.

4. The actuating drive according to claim 1, wherein the actuator cooperates with an adjusting element rotatably mounted about the axis of rotation of the drive gear.

5. The actuating drive according to claim 4, wherein the adjusting element includes a circumferential cylindrical shell surface and a cutout arranged at the shell surface.

6. The actuating drive according to claim 5, wherein the transmission element
is supported on the shell surface in order to provide the direct coupling between the drive gear and the output element when the actuator is in the first position, and
immerses into the cutout so that the output element is movable relative to the drive gear when the actuator is in the second position and the output element is located in the predetermined portion of the adjustment path.

7. The actuating drive according to claim 5, wherein the actuator in the first position holds the adjusting element in a support position in which the transmission element is supported on the shell surface.

8. The actuating drive according to claim 7, wherein the adjusting element in the support position rests against a stop of a housing of the actuating drive.

9. The actuating drive according to claim 7, wherein the adjusting element is coupled with the drive element via a mechanical spring, wherein the spring is formed to move the adjusting element from the support position into a release position in which the transmission element can be introduced into the cutout when the actuator is transferred from the first position into the second position and the output element is located in the predetermined portion of the adjustment path.

10. The actuating drive according to claim 9, wherein the mechanical spring is formed to effect an adjustment force on the adjusting element
from the support position in a direction of the release position when the output element is located in the predetermined portion of the adjustment path, and
from the release position in a direction of the support position when the output element is moved from a starting position outside the predetermined portion of the adjustment path and driven by the drive element in direction of the predetermined portion of the adjustment path.

11. The actuating drive according to claim 1, wherein the actuator is formed
to take the first position when an electric voltage provided by an energy supply system of the vehicle is above a predetermined limit value, or
to take the second position when the electric voltage of the energy supply system is below the predetermined limit value.

12. The actuating drive according to claim 1, wherein the actuator comprises an electric or electromagnetic actuating element.

13. The actuating drive according to claim 1, wherein the actuator comprises an electric lifting magnet as actuating element.

* * * * *